United States Patent
Lee

(10) Patent No.: US 11,564,378 B2
(45) Date of Patent: Jan. 31, 2023

(54) POULTRY DRINKER SYSTEM

(71) Applicant: Maximilian B. Lee, Terra Bella, CA (US)

(72) Inventor: Maximilian B. Lee, Terra Bella, CA (US)

(*) Notice: Subject to any disclaimer, the term of this patent is extended or adjusted under 35 U.S.C. 154(b) by 142 days.

(21) Appl. No.: 17/152,066

(22) Filed: Jan. 19, 2021

(65) Prior Publication Data
US 2022/0225595 A1    Jul. 21, 2022

(51) Int. Cl.
*A01K 39/024* (2006.01)

(52) U.S. Cl.
CPC ................ *A01K 39/024* (2013.01)

(58) Field of Classification Search
CPC .......... A01K 39/024; A01K 7/04; A01K 7/02; B67D 7/00; B67D 3/0041; B67D 3/0003
USPC ............................................. 119/78
See application file for complete search history.

(56) References Cited

U.S. PATENT DOCUMENTS

| | | | | |
|---|---|---|---|---|
| 258,619 A * | 5/1882 | Welty | ........... | A01K 39/024 119/80 |
| 564,635 A * | 7/1896 | North | ........... | A01K 39/024 119/79 |
| 788,666 A * | 5/1905 | Mosure | ........... | A01K 39/024 119/80 |
| 1,786,024 A * | 12/1930 | Olson | ........... | A01K 39/024 119/73 |
| 1,851,682 A * | 3/1932 | Oakes | ........... | A01K 39/024 119/80 |
| 1,929,789 A * | 10/1933 | Olson | ........... | A01K 39/024 119/73 |
| 2,094,194 A | 9/1937 | Swanson | | |
| 2,097,719 A * | 11/1937 | Brembeck | ........... | A01K 39/024 119/80 |
| 2,150,499 A * | 3/1939 | Goltz | ........... | A01K 39/024 119/79 |
| 2,154,152 A | 4/1939 | Frank et al. | | |
| 2,165,968 A | 7/1939 | Hill | | |
| 2,234,406 A | 3/1941 | Clyde et al. | | |
| 2,316,427 A | 4/1943 | Elliott | | |
| 2,338,072 A | 12/1943 | Quinn | | |
| 2,364,991 A | 12/1944 | Marshall | | |
| 2,397,479 A | 4/1946 | Gilbert | | |
| 2,407,216 A | 9/1946 | Ball | | |
| 2,469,617 A | 5/1949 | Tippett | | |
| 2,487,267 A | 11/1949 | Clarence | | |
| 2,871,822 A * | 2/1959 | Ernst | ........... | A01K 7/04 119/73 |

(Continued)

FOREIGN PATENT DOCUMENTS

| | | | | |
|---|---|---|---|---|
| CN | 107996458 A | * | 5/2018 | ........... A01K 39/024 |
| GB | 2167638 A | * | 6/1986 | ........... A01K 39/024 |

(Continued)

*Primary Examiner* — Timothy D Collins
*Assistant Examiner* — Maria E Graber
(74) *Attorney, Agent, or Firm* — Olav M. Underdal; IDP Patent Services

(57) ABSTRACT

A poultry drinker system includes a liquid container, which is filled with water; a drinking trough, which is fluidly connected to the liquid container; a float valve assembly, which is configured to regulate the flow of the liquid from the liquid container into the drinking trough; such that the float valve maintains the water level in the drinking trough as poultry drink the water.

22 Claims, 16 Drawing Sheets

(56) References Cited

U.S. PATENT DOCUMENTS

| | | | | |
|---|---|---|---|---|
| 2,960,965 | A * | 11/1960 | Cordis | A01K 39/02 |
| | | | | 119/51.5 |
| 3,405,687 | A * | 10/1968 | Ruter | A01K 39/024 |
| | | | | 137/448 |
| 3,437,075 | A * | 4/1969 | Hawes, Jr. | A01K 5/0216 |
| | | | | 119/57.2 |
| 3,675,627 | A | 7/1972 | Myers | |
| 3,874,344 | A * | 4/1975 | Smith | A01K 39/024 |
| | | | | 119/78 |
| 4,164,201 | A | 8/1979 | Vanderhye | |
| 4,180,015 | A * | 12/1979 | Dawson, Jr. | A01K 39/024 |
| | | | | 119/80 |
| 4,196,699 | A | 4/1980 | Leeming | |
| 4,254,794 | A * | 3/1981 | Smith | A01K 39/024 |
| | | | | 137/448 |
| 4,274,365 | A * | 6/1981 | Peters | A01K 7/04 |
| | | | | 137/426 |
| 4,421,061 | A | 12/1983 | Shomer | |
| 4,433,642 | A | 2/1984 | Roy | |
| 4,628,867 | A * | 12/1986 | Brougham | A01K 7/04 |
| | | | | 119/78 |
| 4,892,061 | A | 1/1990 | Steudler, Jr. | |
| 5,099,798 | A * | 3/1992 | Ohara | A01K 39/0213 |
| | | | | 119/80 |
| 5,306,029 | A * | 4/1994 | Kaiser, II | A47B 31/02 |
| | | | | 280/30 |
| 5,921,272 | A * | 7/1999 | Cavagna | F16K 31/34 |
| | | | | 137/446 |
| 7,735,455 | B2 | 6/2010 | Clark, Jr. | |
| 8,826,859 | B1 * | 9/2014 | Slinkard | A01K 7/04 |
| | | | | 119/80 |
| 9,199,782 | B1 * | 12/2015 | Cliatt | F25D 3/06 |
| 10,383,311 | B1 * | 8/2019 | Kane | A01K 39/024 |
| 2005/0034949 | A1 * | 2/2005 | Davies | A45C 7/0036 |
| | | | | 190/111 |
| 2006/0180421 | A1 * | 8/2006 | Godshaw | A01K 1/0254 |
| | | | | 190/18 A |
| 2013/0284103 | A1 * | 10/2013 | Colvin | A01K 39/0206 |
| | | | | 119/78 |
| 2020/0045940 | A1 * | 2/2020 | Slinkard | A01K 39/024 |

FOREIGN PATENT DOCUMENTS

| | | | | |
|---|---|---|---|---|
| GB | | 2347603 A * | 9/2000 | A01K 39/024 |
| WO | WO-2017019038 A1 * | | 2/2017 | A01K 5/0114 |

* cited by examiner

Poultry Drinker System

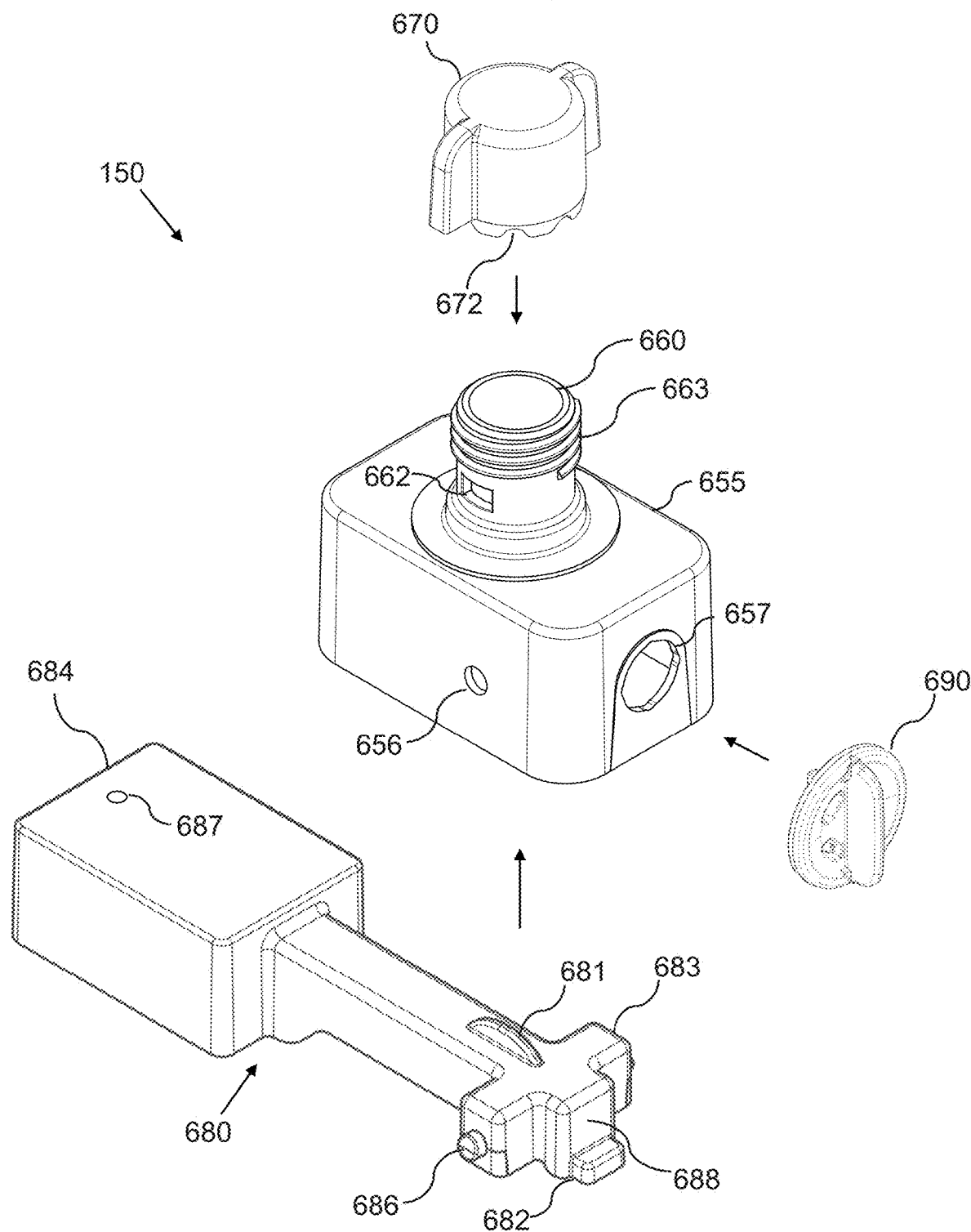

POULTRY DRINKER SYSTEM

CROSS-REFERENCE TO RELATED APPLICATIONS

N/A.

FIELD OF THE INVENTION

The present invention relates generally to the field of poultry, and more particularly to methods and systems for poultry drinkers.

BACKGROUND OF THE INVENTION

There are many poultry drinkers in the market. Most consist of a round cylindrical shape top or body and a round base where the poultry can drink. Additionally, most use a vacuum mechanism to discharge water from the body to the base. Common sizes range from a quart to a 2-gallon capacity. However, as the number of chickens multiply, the users need larger drinkers. Larger drinkers are heavier and cumbersome to move when refilling or moving to a different location.

Further, poultry can be messy drinkers, and saliva and feed tend to fall into the drinking trough, which can cause the water in a liquid container to become contaminated, when there is no effective sealing. Such contamination may happen with most drinkers that use a vacuum valve design, which includes a drinking dish and a cylindrical water tank connected via a hole, since the hole is continuously connecting the water tank with the dispensing dish.

As such, considering the foregoing, it may be appreciated that there continues to be a need for novel and improved devices and methods for poultry drinkers.

SUMMARY OF THE INVENTION

The foregoing needs are met, to a great extent, by the present invention, wherein in aspects of this invention, enhancements are provided to the existing model of poultry drinker systems.

In an aspect, a poultry drinker system can include:
a) a liquid container, which can include a top opening, such that a liquid can be poured into the liquid container from the top opening; and
b) a drinking trough, such that the liquid container is fluidly connected to the drinking trough;
such that poultry can access and drink the liquid from the drinking trough; and
c) a float valve assembly, which can be configured to regulate a flow of the liquid from the liquid container into the drinking trough, such that the float valve assembly can be opened to release the liquid from the liquid container and can be closed to stop the liquid from flowing from the liquid container; and
wherein the float valve assembly can be configured to close when the liquid in the drinking trough has reached a predetermined maximum liquid level, and wherein the float valve assembly can be configured to open when the liquid in the drinking trough is below the predetermined maximum liquid level;
whereby the float valve assembly can automatically release the liquid from the liquid container into the drinking trough until it reaches the predetermined maximum liquid level, such that the float valve assembly can maintain the predetermined maximum liquid level in the drinking trough as poultry drinks the liquid in the drinking trough.

In a related aspect, a poultry drinker system can further include:
a) two wheels, which are attachable to the bottom rear end of the liquid container, such that the poultry drinker system can be rolled for easy portability; and
b) a handle, which can be slidably attached to the rear side of the liquid container, such that the handle can be slid upwards to an extended height that can enable the user to roll the poultry drinker system from a standing distance.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 6A is a top perspective view of a disassembled float valve assembly, according to an embodiment of the invention.

DETAILED DESCRIPTION

Figure 1A:
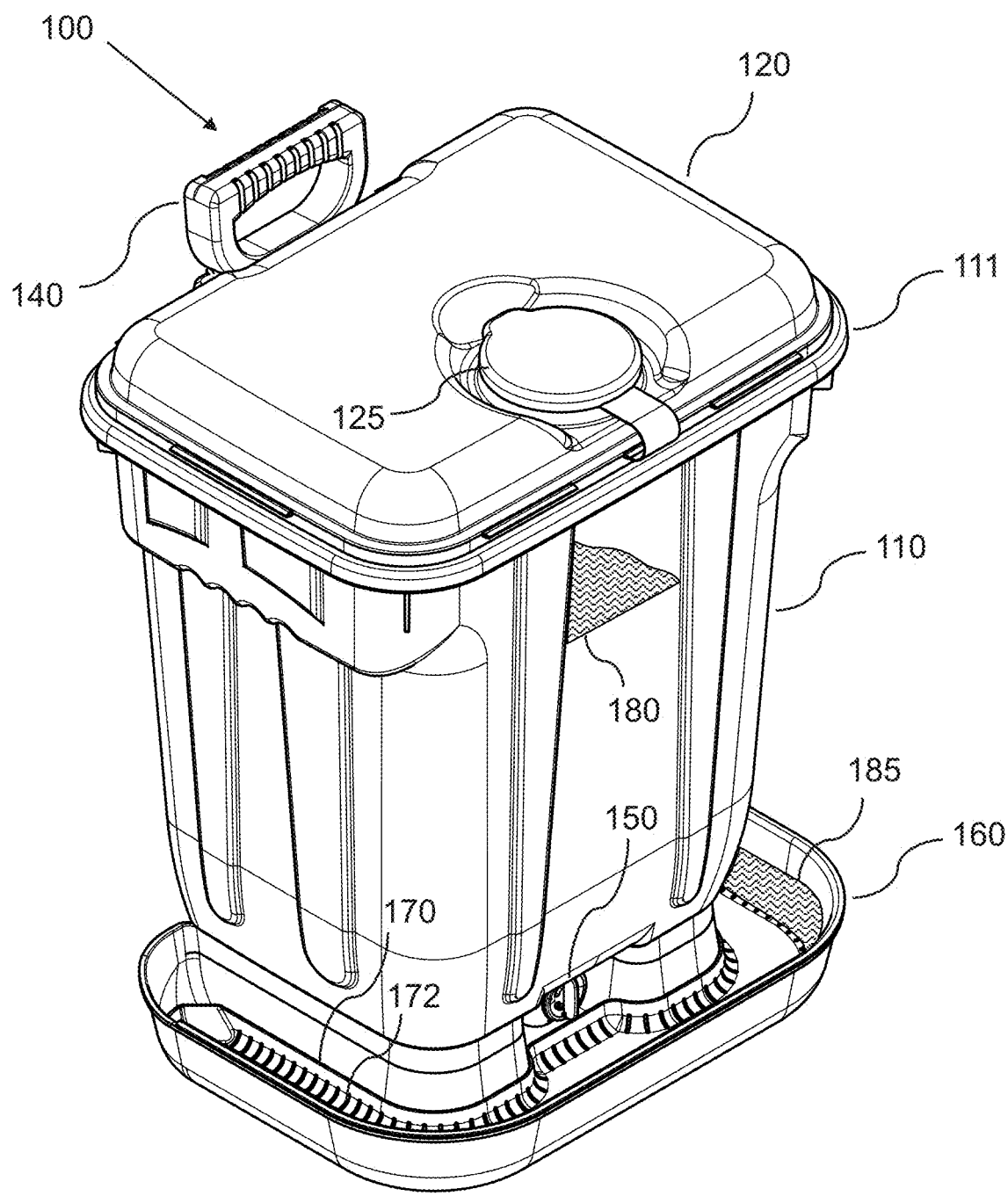
FIG. 1A is a top perspective view of a poultry drinker system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a poultry drinker system 100 with reference to FIG. 1, in such manner that like reference numerals refer to like components throughout; a convention that we shall employ for the remainder of this specification.

Figure 1B:
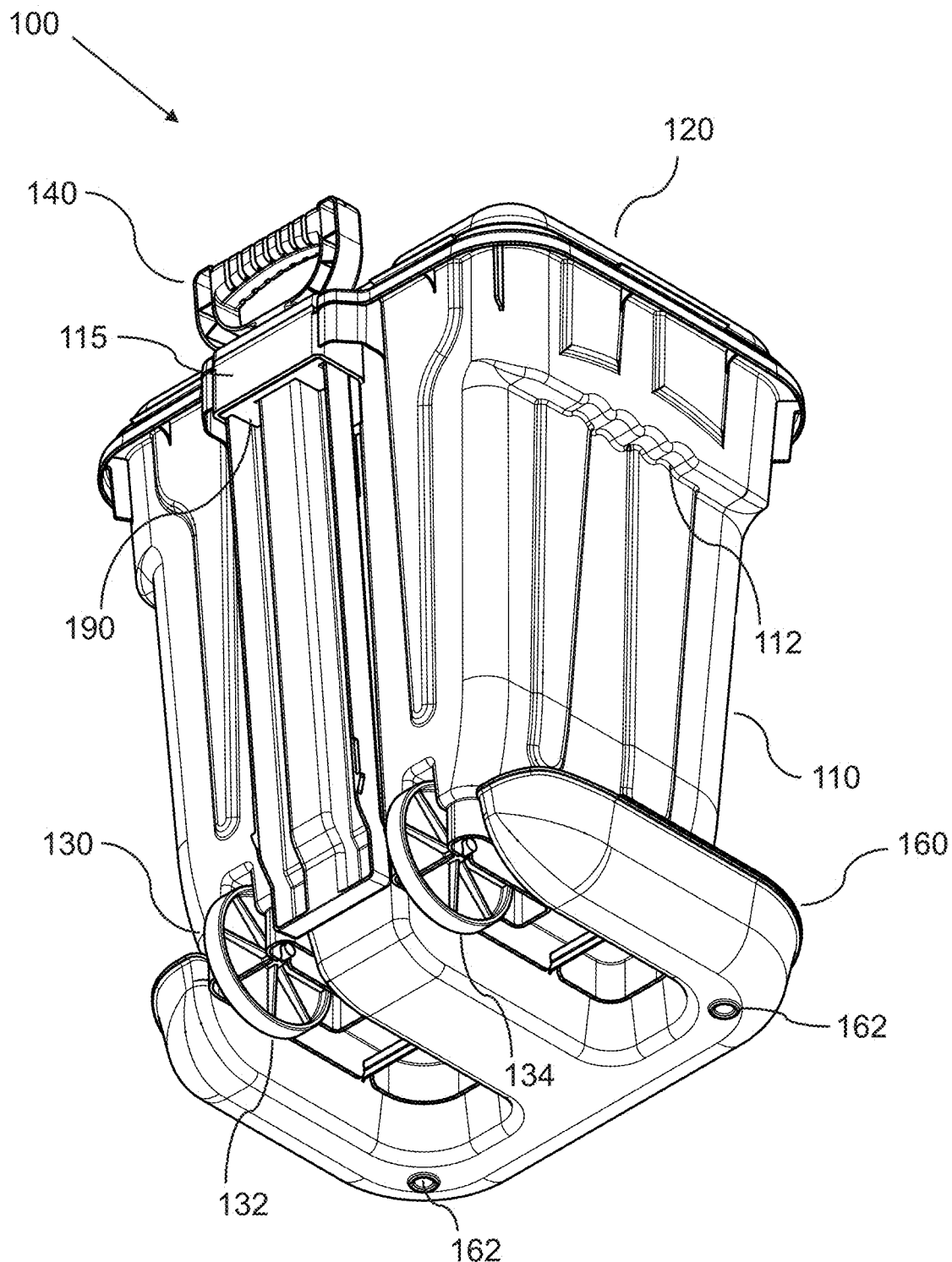
FIG. 1B is a bottom perspective view of a poultry drinker system, according to an embodiment of the invention.
Figure 1C:
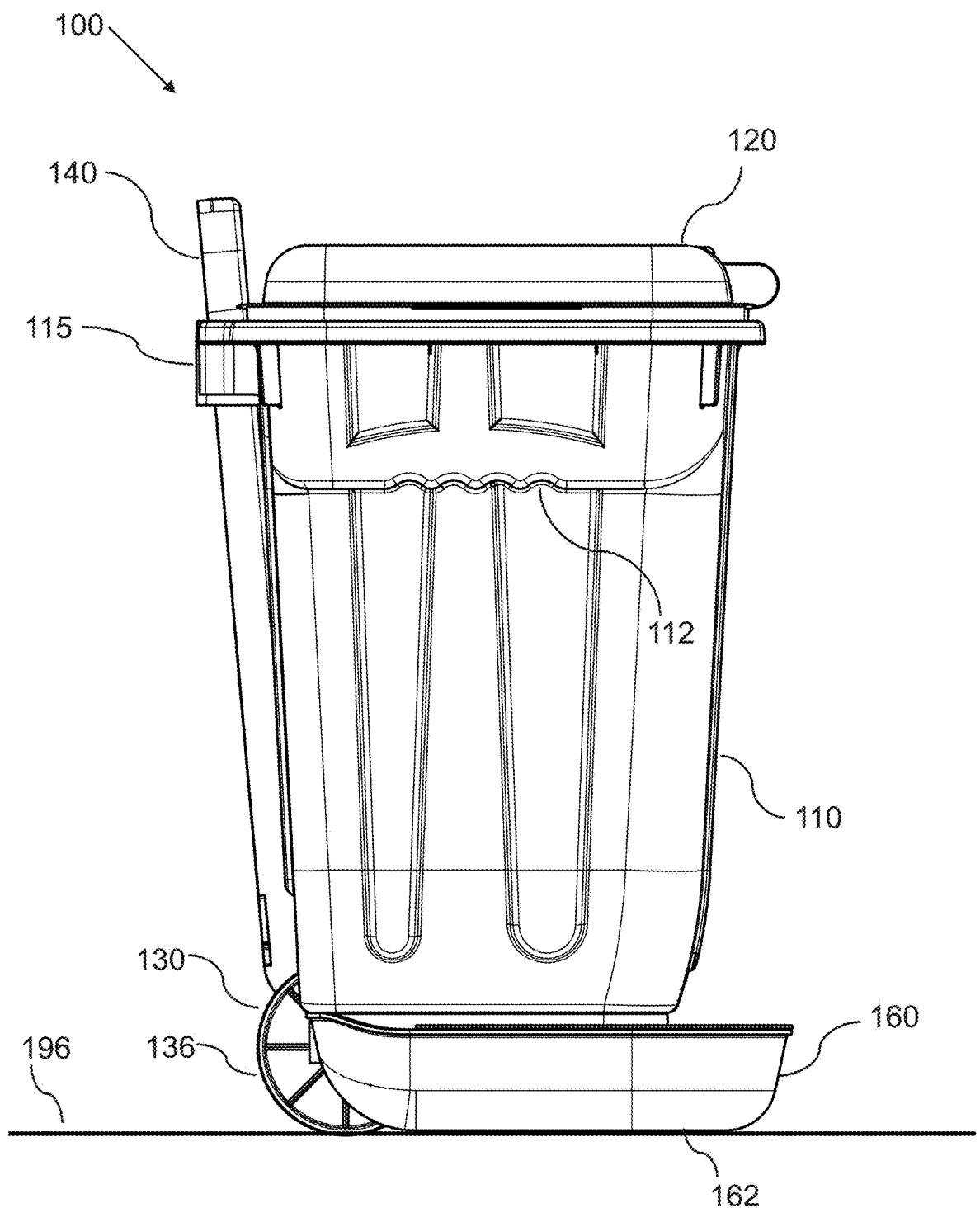
FIG. 1C is a side view of a poultry drinker system in a standing position, according to an embodiment of the invention.
Figure 2A:
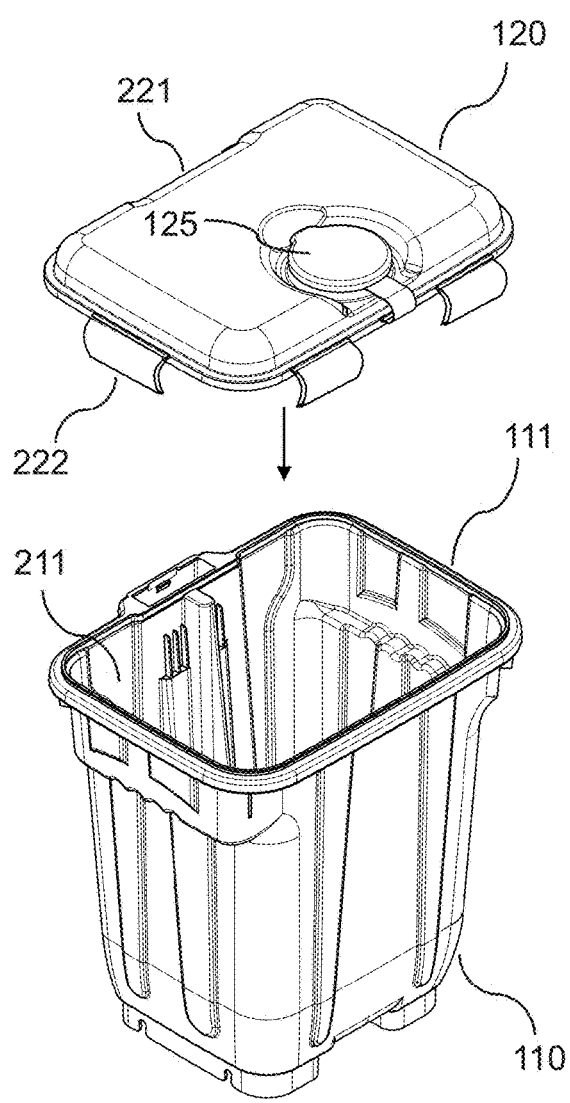
FIG. 2A is a top perspective view illustrating the assembly of a lid assembly and a liquid container, according to an embodiment of the invention.
Figure 2B:
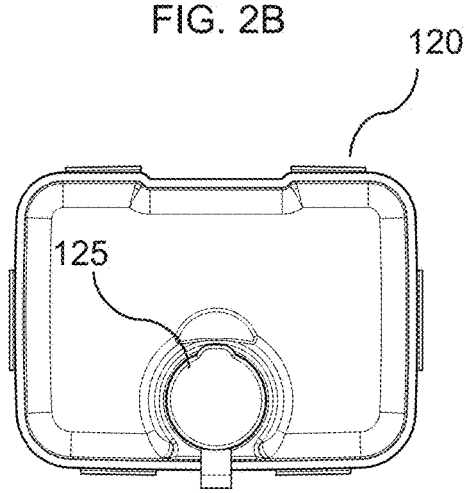
FIG. 2B is a top view of a lid assembly, according to an embodiment of the invention.

In an embodiment, as shown in FIGS. 1A and 1B, a poultry drinker system 100 can include:

a) a liquid container 110, which can include a top opening 211 (as shown in FIG. 2A), such that a liquid 180 (i.e. typically water 180) can be poured into the liquid container 110 through the top opening 211;

b) a drinking trough 160, which can attach to a bottom end of the drinking container 110, such that the liquid container 110 is fluidly connected to the drinking trough 160;

wherein the drinking trough 160 can be configured to extend past front, left, and right sides of the drinking container 110, such that poultry can drink the liquid 180 from the drinking trough 160; and c) a float valve assembly 150, which can be attached to the bottom end of the liquid container 110, such that the float valve assembly 150 can be configured to regulate a flow of the liquid 180 from the liquid container 110 into the drinking trough 160, such that the float valve assembly 150 can be opened to release the liquid 180 from the liquid container 110 and can be closed to stop the liquid 180 from flowing from the liquid container 110; and wherein the float valve assembly 150 can be configured to close when the liquid 180 in the drinking trough 160 has reached a predetermined maximum liquid level 185, and wherein the float valve assembly 150 can be configured to open when the liquid 180 in the drinking trough 160 is below the predetermined maximum liquid level 185;

whereby the float valve assembly 150 can automatically release the liquid 180 from the liquid container 110 into the drinking trough 160 until it reaches the predetermined maximum liquid level 185, such that the float valve assembly 150 can maintain the predetermined maximum liquid level 185 in the drinking trough 160 as poultry drinks the liquid 180 in the drinking trough 160.

Thus, the float valve assembly 150 seals and keeps the water of the liquid container 110 from the drinking trough 170, and thereby reduces a risk that the water in the liquid container 110 becomes contaminated.

Figure 9A:
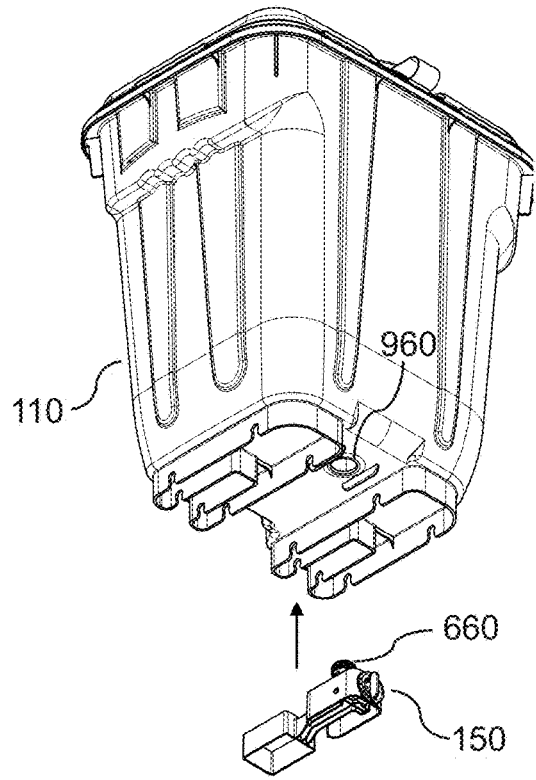
FIG. 9A is a bottom perspective view of a liquid container, according to an embodiment of the invention.
Figure 9B:
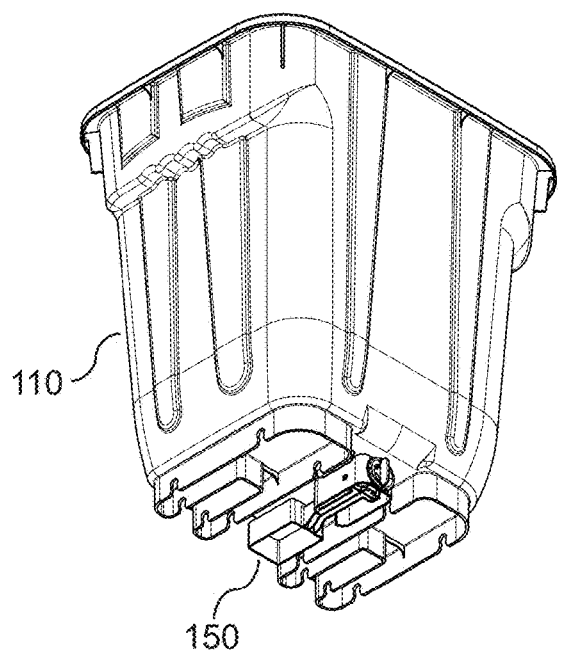
FIG. 9B is a bottom perspective view of an assembled liquid container and float valve assembly, according to an embodiment of the invention.
Figure 9C:
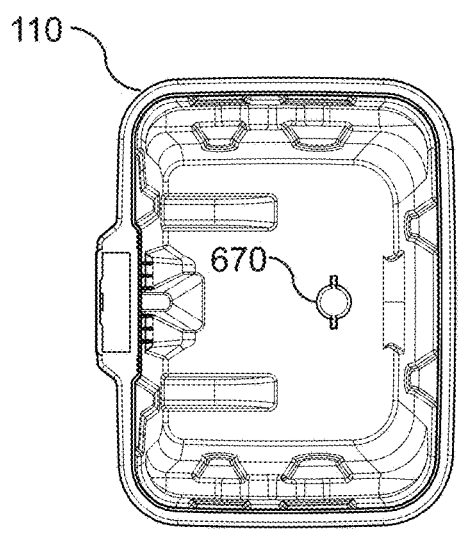
FIG. 9C is a top view of an assembled liquid container and float valve assembly, according to an embodiment of the invention.
Figure 9D:
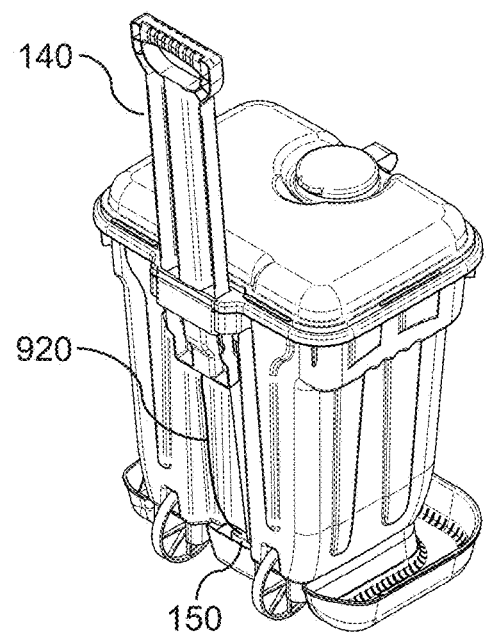
FIG. 9D is a rear perspective view of a poultry drinker system with an extended handle, according to an embodiment of the invention.

In a related embodiment, as shown in FIGS. 1B and 9D, a poultry drinker system 100 can further include:

a) two wheels 130, which are attachable to the bottom rear end of the liquid container 110, such that the poultry drinker system 100 can be rolled for easy portability;

b) a handle 140, which can be slidably attached to the rear side of the liquid container 110, such that the handle 140 can be slid upwards to an extended height, as shown in FIG. 9D, that can enable the user to roll the poultry drinker system 100 from a standing distance; and c) lifting indentations 112, which function as embedded handles 112, positioned on opposing sides of the liquid container 110, such that the lifting indentations 112 are configured for lifting the poultry drinker system 100.

Figure 3A:
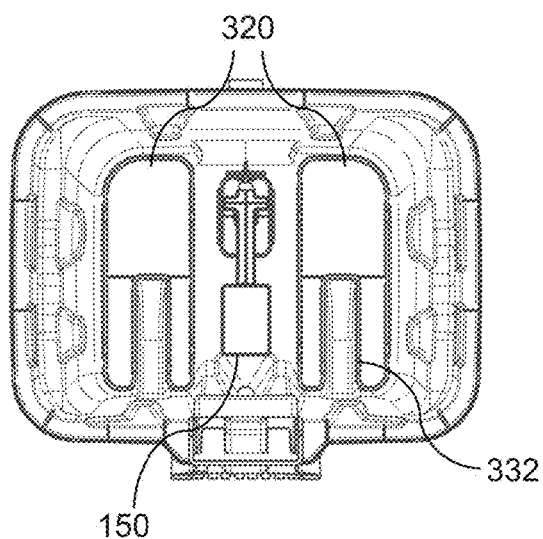
FIG. 3A is a bottom view of a liquid container, according to an embodiment of the invention.
Figure 3B:
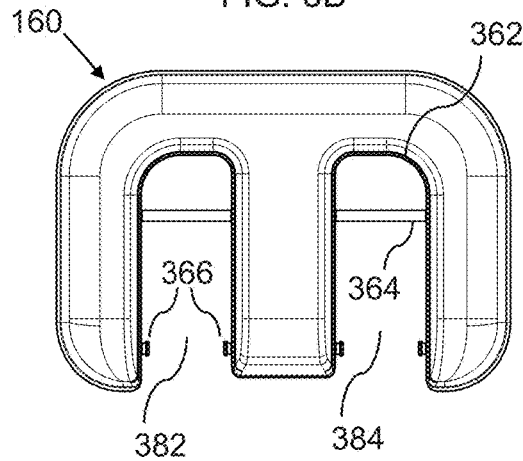
FIG. 3B is a top view of a drinking trough, according to an embodiment of the invention.
Figure 3C:
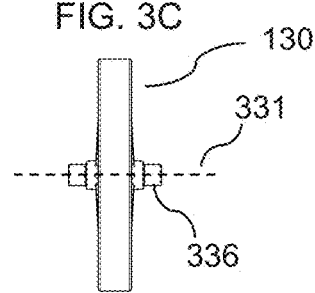
FIG. 3C is a top view of a wheel, according to an embodiment of the invention.
Figure 3D:
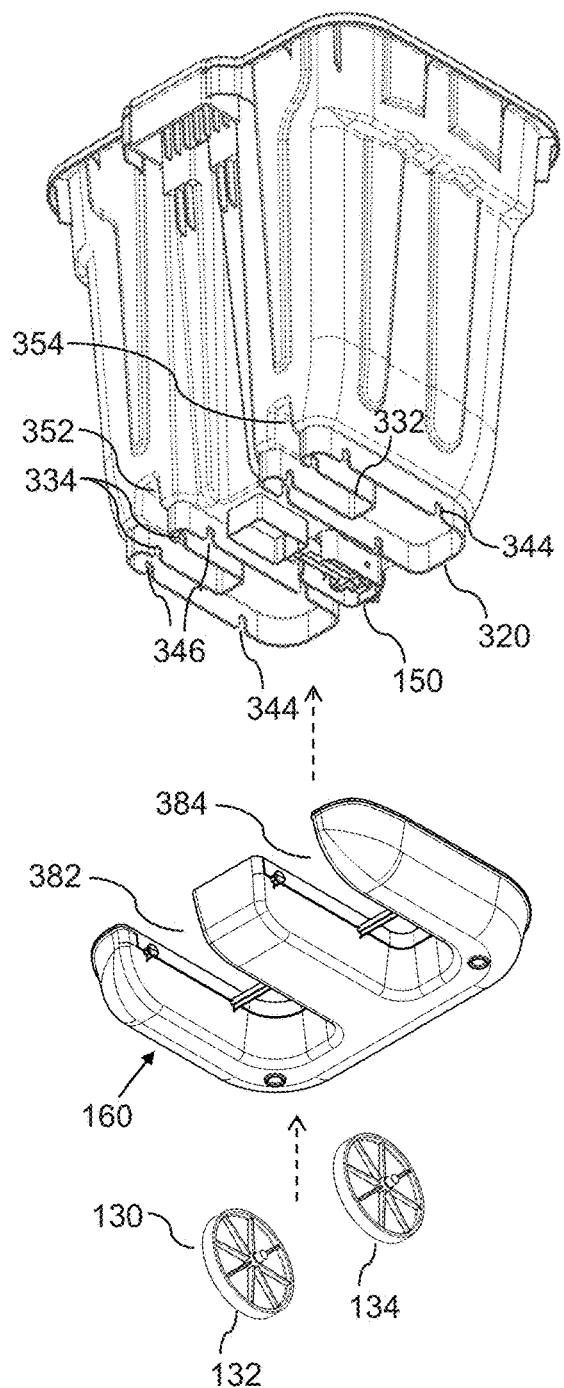
FIG. 3D is a bottom perspective view illustrating the assembly of a liquid container, a drinking trough, and two wheels, according to an embodiment of the invention.
Figure 5A:
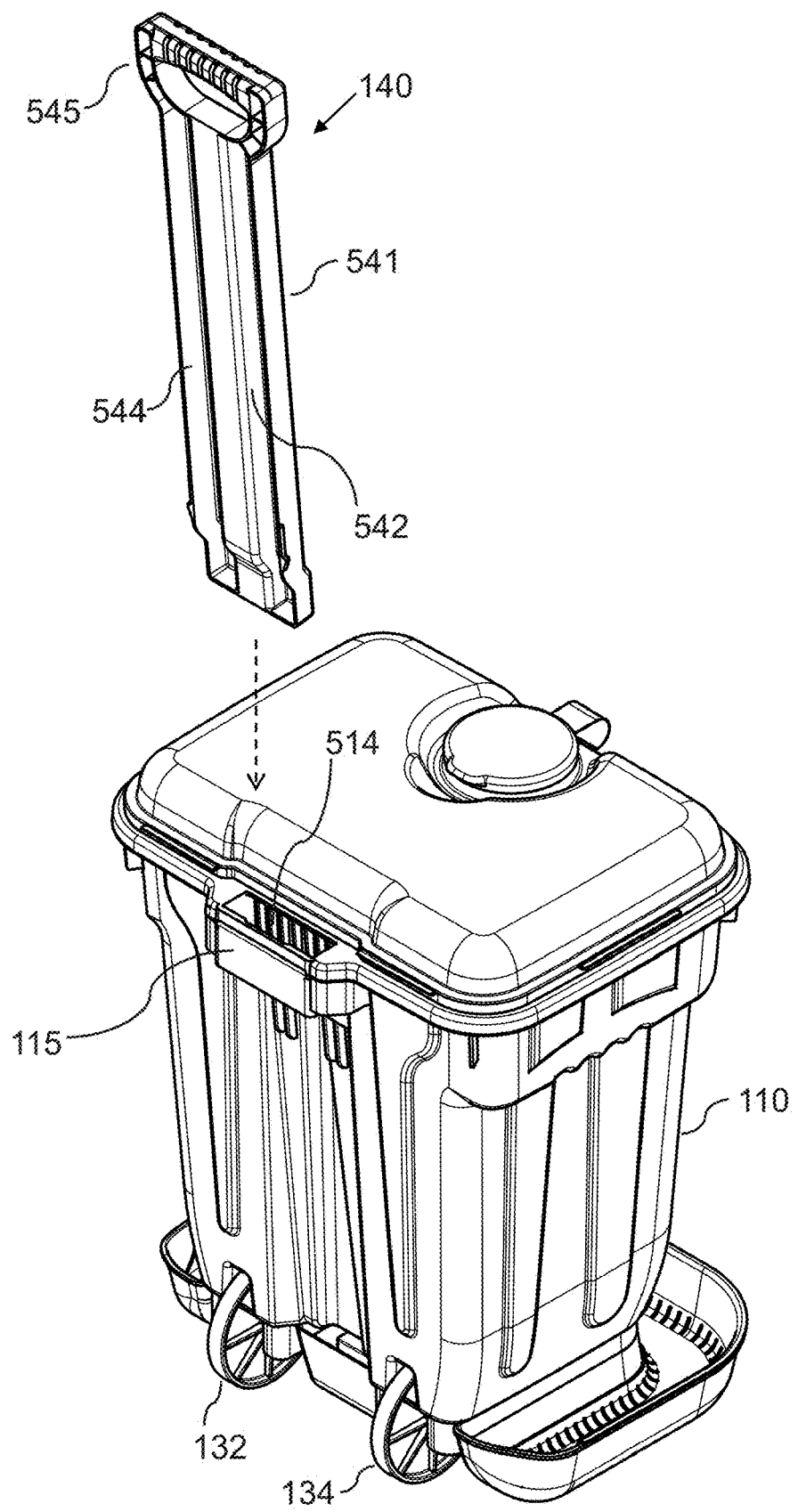
FIG. 5A is a rear perspective view illustrating the insertion of a handle into a liquid container, according to an embodiment of the invention.

In a related embodiment, as shown in FIGS. 3B, 3D, and 5A, the drinking trough 160 can be designed to be relatively flat relative to the floor in order to provide a large perimeter for multiple birds to drink at the same time. In order to accommodate dirty or uneven surfaces, use of relatively large wheels 130 can improve rolling performance and provides the necessary clearance from the floor surface. However, in order to avoid a forward inclination in a directly proportional manner, the wheels 130 can be partially embedded inside left and right wheel indentations 352, 354 in a rear bottom part of the liquid container 110, such that the poultry drinker system 100 must be tilted back in order to utilize a wheel clearance that is provided in the back, as shown in FIGS. 1B, 1C, 1D, and 3D, in order to move the poultry drinker system 100. Further, the drinking through can be configured with left and right rear openings, 382, 384, which protrude into a rear of the drinking through, such that the left and right rear openings, 382, 384 are aligned with the left and right wheel indentations 352, 354, respectively, such that the left and right wheels 130 are partially embedded into the left and right rear openings 382, 384 and the left and right wheel indentations 352, 354, respectively.

Thus, in a related embodiment, as shown in FIGS. 1B, 1C, 1D, and 3D, the poultry drinker system 100 can further include:
a) a right wheel 132, which is rotatably connected to a bottom of the liquid container 110; and
b) a left wheel 134, which is rotatably connected to the bottom of the liquid container 110;
wherein a rear bottom part of the liquid container 110 further comprises:
   a left wheel indentation 352; and
   a right wheel indentation 354;
   such that the right wheel 134 is partially embedded inside the right wheel indentation 354; and
   such that the left wheel 132 is partially embedded inside the left wheel indentation 352;
such that a portion of each of the right wheel 130 and the left wheel 130 protrudes below and behind the liquid container, as shown in FIGS. 1B and 5A.

Figure 1D:
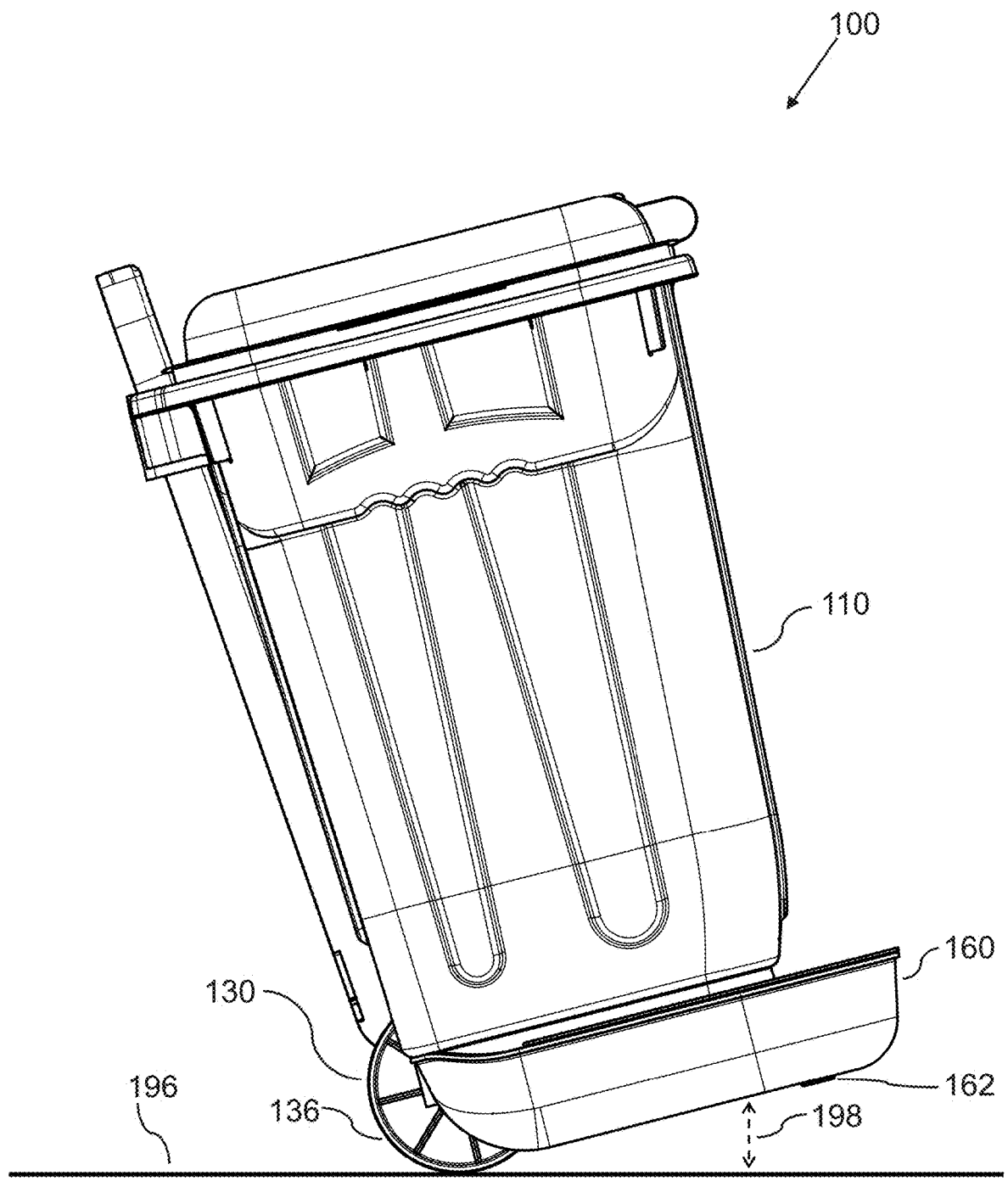
FIG. 1D is a side view of a poultry drinker system in an inclined position, according to an embodiment of the invention.

In a further related embodiment, as shown in FIGS. 1B, 1C, 1D, and 3D, a rear of the drinking trough 160 can further include:
a) a left rear opening 382;
b) a right rear opening 384;
such that the left rear opening 382 is aligned with the left wheel indentation 352;
such that the right rear opening 384 is aligned with the right wheel indentation 354;
such that the left wheel 132 is partially embedded in the left rear opening; and
such that the right wheel is partially embedded in the right rear opening;
such that the right wheel 134 and the left wheel 132 protrude behind the trough, such that bottom/lowest portions of the right wheel 134 and the left wheel 132 are substantially at level with a bottom portion 162 or portions 162 of the drinking trough 160, as shown in FIGS. 1B and 5A (or alternatively other bottom portions 162 of the poultry drinker system 100), such that the poultry drinker system 100 can rest in a standing position on the right wheel 134 and the left wheel 132, and the bottom portion/portions 162 of the drinking trough 160 (or other bottom/lowest portions 162 of the poultry drinker system 100);

such that rear protruding portions 136 of the right wheel 134 and the left wheel 132 enable the poultry drinker 100 to be inclined to gain clearance 198 from a floor surface 196 and to be rolled on the right wheel 134 and the left wheel 132, as shown in FIG. 1D.

In another related embodiment, as shown in FIGS. 1A, 2A, 2B, and 2C, a poultry drinker system 100 can further include:
a) a lid assembly 120, which can be configured to attach to an upper rim 111 of the drinking container 110, such that the lid assembly 120 can cover the top opening 211 of the liquid container 110, such that the lid assembly 120 can prevent the liquid 180 from spilling out of the liquid container 110 from the top opening 211;
wherein the lid assembly 120 can be detachably connected or hingedly connected to the upper rim 111 of the liquid container 110.

In a related embodiment, as shown in FIG. 2A, the lid assembly 120 can include:
a) a lid body 221; and
b) snap on connectors 222, as shown in FIG. 2A, which can be rotatably connected to the lid body 221, such that the snap on connectors 222 can be rotated to be pushed onto the upper rim 111, such that when the snap on connectors 222 are pushed onto the upper rim 111, the snap on connectors 222 can snap underneath the upper rim 111 and lock into place, such that when the snap on connectors 222 are pulled from the upper rim 111, the snap on connectors 222 can detach from the upper rim 111;
whereby the snap on connectors 222 can detachably attach the lid body 221 to the upper rim 111 of the liquid container 110.

In a further related embodiment, as shown in FIGS. 1A, 2A, 2B, and 2C, the lid assembly 120 can further include:
a) a lid aperture 224, which can protrude through the lid body 221, such that the liquid container 110 can be fillable with the liquid 180 through the lid aperture 224, such that the liquid container 110 can be fillable with the liquid 180 without removing the lid assembly 120; and
b) a cap 125, which can be configured to detachably cover the lid aperture 224, such that the cap 125 can be hingedly connected to the lid body 221, such that the cap 125 can be rotated to be positioned on the lid aperture 224;
wherein the cap 125 can be pushed into the lid aperture 224 to securely cover the lid aperture 224, such that the cap 125 can prevent liquid 180 from spilling out of the liquid container 110 through the lid aperture 224 when the cap 125 is pushed into the lid aperture 224, such that the cap 125 can be pulled to detach from the lid aperture 224 and provide access to the liquid container 110.

Figure 2C:
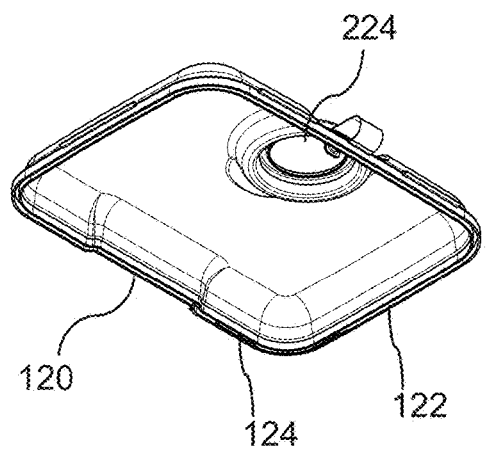
FIG. 2C is a bottom perspective view of a lid assembly, according to an embodiment of the invention.

In a further related embodiment, as shown in FIG. 2C, the lid assembly 120 can further include:
a) a gasket 124, which can be a tubular silicon gasket 124, which can be positioned in a peripheral slit 122 on a bottom side of the lid body 221, along an outer periphery of the lid assembly 120, such that the peripheral slit 122 follows the contour of the lid body 221;
such that he gasket 124 can seal the lid assembly 120 against the upper edge of the liquid container 110, to avoid any water splash when the poultry drinker system 100 is filled with water and in motion.

In a related embodiment, as shown in FIGS. 3A, 3B, 3C and 3D, the liquid container 110 can include:
a) two attachment protrusions 320, which can protrude from a bottom surface of the liquid container 110, such that the two attachment protrusions 320 can be positioned on either side of the float valve assembly 150;

wherein the two attachment protrusions 320 can be configured to attach the wheels 130 and the drinking trough 160 to the liquid container 110.

In a further related embodiment, as shown in FIGS. 3A, 3B, 3C and 3D, each of the two attachment protrusions 320 can include:
a) a wheel gap 332, which can protrude through each attachment protrusion 320, such that a wheel 130 can be inserted through the wheel gap 332; and
b) wheel apertures 334, which can be laterally protruded through either side of each wheel gap 332, such that the wheel apertures 334 can align with a central axis 331 of a wheel 130;
wherein each of the wheels 130 can include axle protrusions 336, which can protrude from either side of the wheel 130 along the central axis 331;
such that each of the axle protrusions 336 can be configured to be insertable into each of the wheel apertures 334, wherein the axle protrusions 336 can securely rotate within the wheel apertures 334; and
wherein the liquid container 110 can further include:
a) left and right wheel indentations 352, 354, which can be positioned on the bottom rear end of the liquid container 110, such that the left and right wheel indentations 352, 354 can align with left and right wheel gaps 332, such that the left and right wheel indentations 352, 354 can be configured to provide space for left and right wheels 130 to rotate when attached to the attachment protrusions 320;
whereby the wheels 130 can rotate as the liquid container 110 moves on a ground surface, such that the liquid container 110 can be rollable for easy portability.

In a related embodiment, as shown in FIGS. 3A, 3B and 3D, the drinking trough 160 can include two gaps 362, such that the two gaps 362 can align with the two attachment protrusions 320, such that the drinking trough 160 can slide over the attachment protrusions 320 to attach to the liquid container 110.

In a further related embodiment, as shown in FIGS. 3A, 3B, 3C, and 3D, the two attachment protrusions 320 can each further include:
a) front attachment apertures 344. which can laterally protrude through the two attachment protrusions 320, such that the front attachment apertures 344 are positioned on the front end of the attachment protrusions 320;
wherein the drinking trough 160 can include two bars 364, such that the two bars 364 can be attached between the inner sides of the two drinking trough gaps 362, such that the two bars 364 can be positioned to align with the front attachment apertures 344 when the drinking trough 160 is slid over the attachment protrusions 320, wherein the two bars 364 can be configured to be securely insertable into the front attachment apertures 344; and
b) rear attachment apertures 346, which are laterally protruded through the two attachment protrusions 320, such that the rear attachment apertures 346 are positioned on the rear end of the attachment protrusions 320;
wherein the drinking trough 160 can include cylindrical protrusions 366, such that the cylindrical protrusions 366 can protrude from the inner sides of the two drinking trough gaps 362, such that the cylindrical protrusions 366 can be positioned to align with the rear attachment apertures 346 when the drinking trough 160 is slid over the attachment protrusions 320, such that each of the cylindrical protrusions 366 can be configured to be securely insertable into each of the rear attachment apertures 346;
whereby the two bars 364 and the cylindrical protrusions 366 can be inserted into the front and the rear attachment apertures, respectively, to securely attach the drinking trough 160 to the liquid container 110.

Figure 4A:
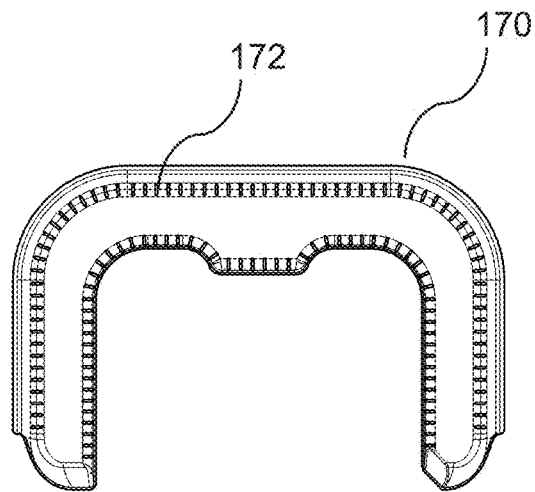
FIG. 4A is a top view of a sieve, according to an embodiment of the invention.
Figure 4B:
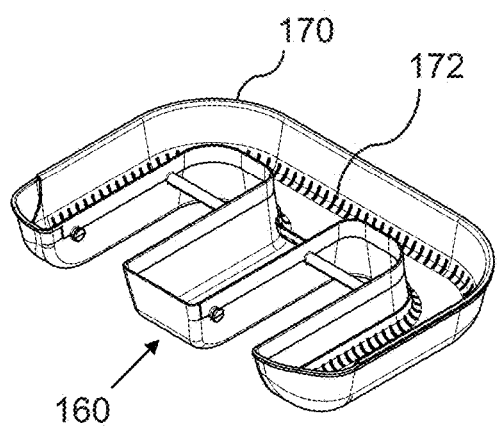
FIG. 4B is a top perspective view of an assembled sieve and drinking trough, according to an embodiment of the invention.
Figure 4C:
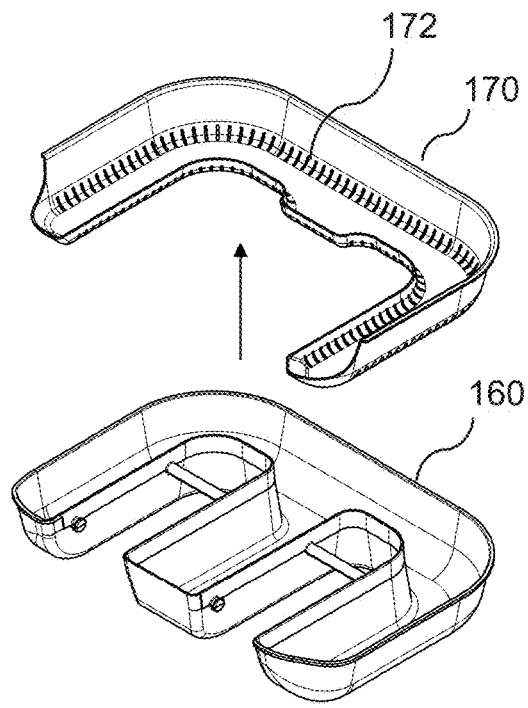
FIG. 4C is a top perspective view illustrating the disassembly of a sieve and a drinking trough, according to an embodiment of the invention.

In a related embodiment, as shown in FIGS. 4A, 4B, and 4C, a poultry drinker system 100 can further include:
a) a sieve 170, which can be configured to be insertable into the drinking trough 160, such that the sieve 170 can be configured to cover a drinking area of the drinking trough 160 from which the poultry drink, such that the sieve 170 can be removable from the drinking trough 160;
wherein the sieve 170 can include a plurality of apertures/slits 172, such that when the sieve 170 is removed from the drinking trough 160, the liquid 180 filters through the plurality of apertures/slits 172, such that remaining debris in the sieve can be removed from the drinking trough 160.

In another related embodiment, as shown in FIGS. 5A, 5B, 5C, and 5D, the handle 140 can include:
a) a handle body 541;
wherein the liquid container 110 can further include a handle receiving structure 115, which can protrude from the top rear end of the liquid container 110, as shown in FIG. 5A, such that the handle receiving structure 115 can define a handle receiving interior 514 that protrudes vertically through the handle receiving structure 115, such that the handle receiving interior 514 can be configured to receive the handle body 541;
whereby the handle body 541 can be configured to be slidably insertable through the handle receiving interior 514, such that the handle 140 can be slidable along the rear side of the liquid container 110.

Figure 5B:
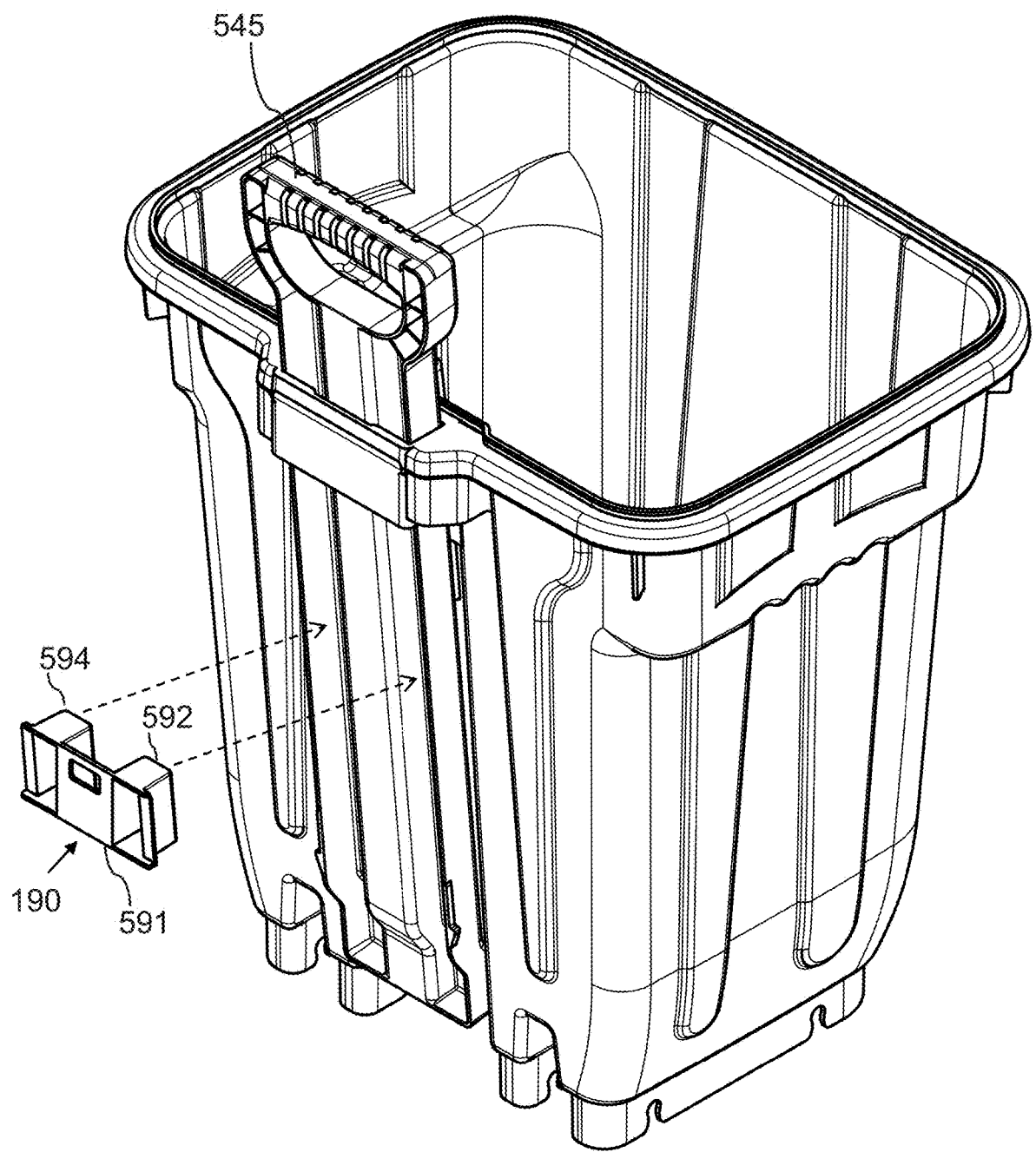
FIG. 5B is a rear perspective view of illustrating the assembly of a handle and a guide rail, according to an embodiment of the invention.

In a further related embodiment, as shown in FIGS. 5A, 5B, SC, and SD, the handle 140 can further include:
a) a handle grip 545, which can protrude from the top end of the handle body 541, that that the handle grip 545 can be configured with a width longer than a width of the handle body 541, such that the handle grip 545 can prevent the handle 140 from slipping out of the handle receiving interior 514 when pushed downwards;
wherein the handle grip 545 can be used to control the handle 140, such that the handle grip 545 can be used to push and pull the handle 140 through the handle receiving interior 514.

Figure 5C:
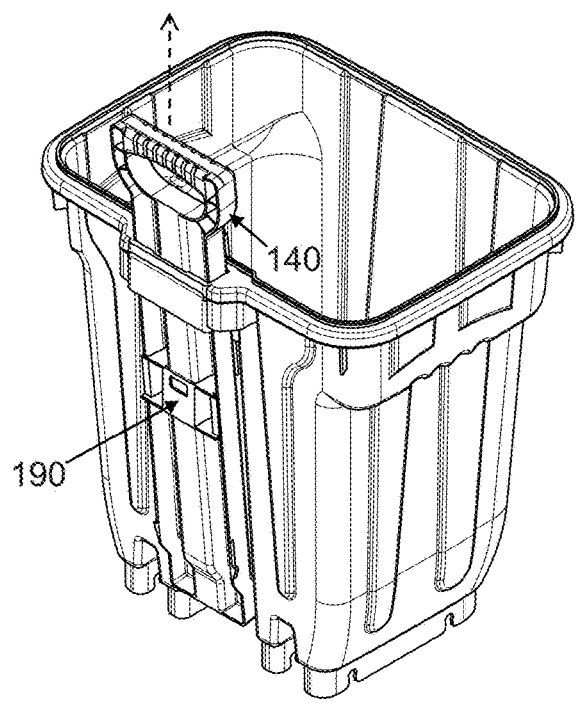
FIG. 5C is a rear perspective view of an assembled liquid container, handle, and guide rail, according to an embodiment of the invention.
Figure 5D:
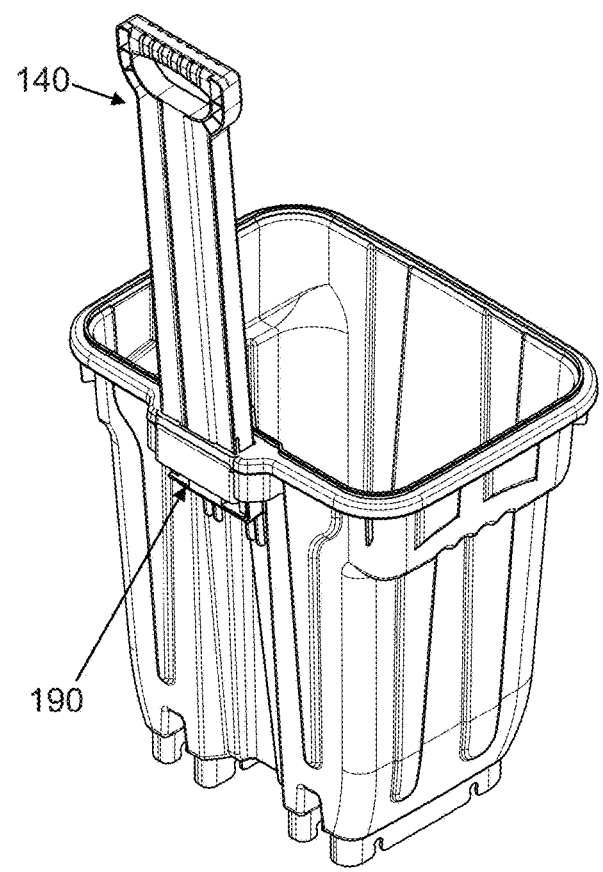
FIG. 5D is a rear perspective view illustrating the insertion of a guide rail into a handle receiving interior, according to an embodiment of the invention.

In a related embodiment, as shown in FIGS. 5A, 5B, SC and SD, the handle 140 can include:
a right handle indentation 542 and a left handle indentation 544, which can each be configured as an elongated vertical indentation of the handle body 541, such that the right handle indentation 542 can be positioned on a right outer side of the handle body 541 and the left handle indentation 544 can be positioned on a left outer side of the handle body 541; and
wherein the poultry drinker system 100 can further include a guide rail 190, such that the guide rail 190 can include:
a) a base plate 591, which can be configured to securely attach to (or touch) a rear interior surface of the handle receiving interior 514; and
b) a right guide protrusion 592 and a left guide protrusion 594, which can each protrude inward from the base plate 591, such that the right and the left guide protrusion 592, 594 can align with the corresponding right and left handle indentation 542, 544, such that the right and the left guide protrusion 592, 594 can be insertable into the corresponding right and left handle indentation 542, 544;
wherein the guide rail 190 can be positioned in the handle receiving interior, as shown in FIG. 5C and 5D;
whereby the handle body 541 slides along the guide rail 190 when the handle body 541 slides through the handle receiving interior 514, such that the guide rail 190 enables the handle 140 to slide smoothly along the rear side of the liquid container 110, such that the handle 140 does not twist or laterally move.

Thus, the handle 140 is designed to provide maximum rigidity and strength minimizing the weight of the material. The guide rail 190 removes any excessive looseness of the handle 140. Without the guide rail 190 the handle 140 may loose all support when fully extended. Further, the guide rail 190 functions as a stopper that prevents the handle from being pulled out of the poultry drinker system 100.

Figure 7A:
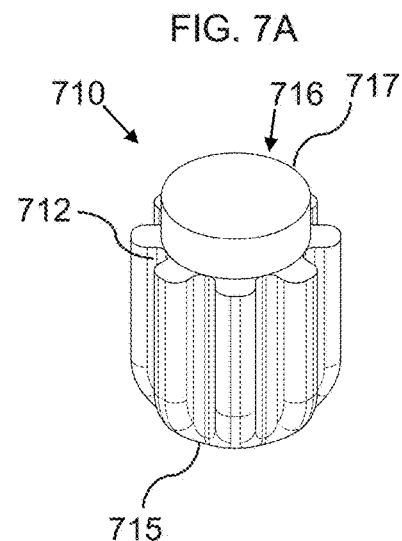
FIG. 7A is a top perspective view of a piston and a plug, according to an embodiment of the invention.
Figure 7B:
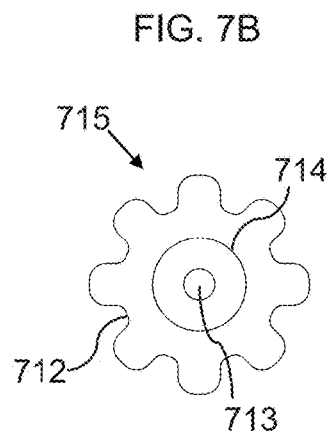
FIG. 7B is a top view of a piston, according to an embodiment of the invention.
Figure 7C:
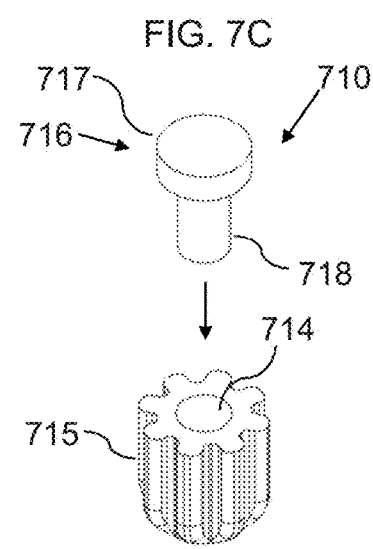
FIG. 7C is a top perspective view illustrating the assembly of a piston and a plug, according to an embodiment of the invention.
Figure 7D:
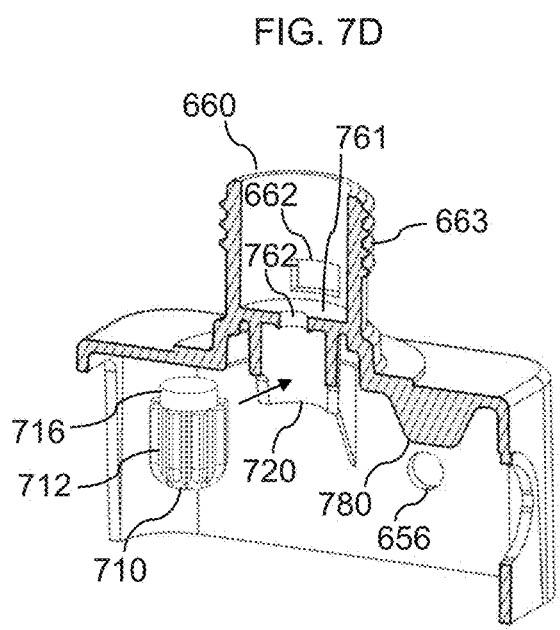
FIG. 7D is a perspective view of a section cut of a float valve body illustrating the insertion of a piston, according to an embodiment of the invention.
Figure 7E:
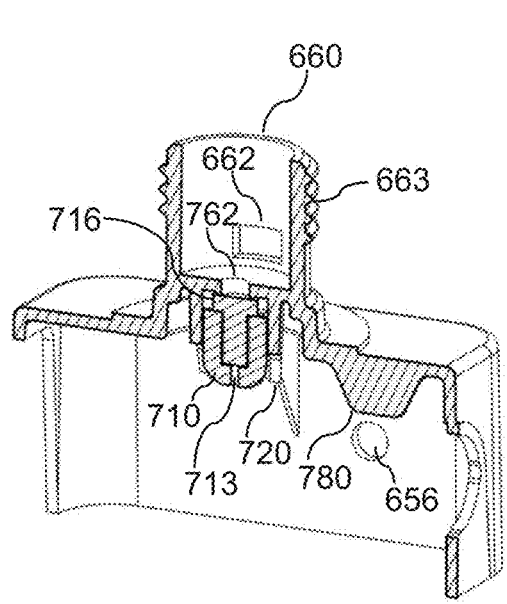
FIG. 7E is a top perspective view of a section cut of an assembled float valve body and a piston, according to an embodiment of the invention.
Figure 8A:
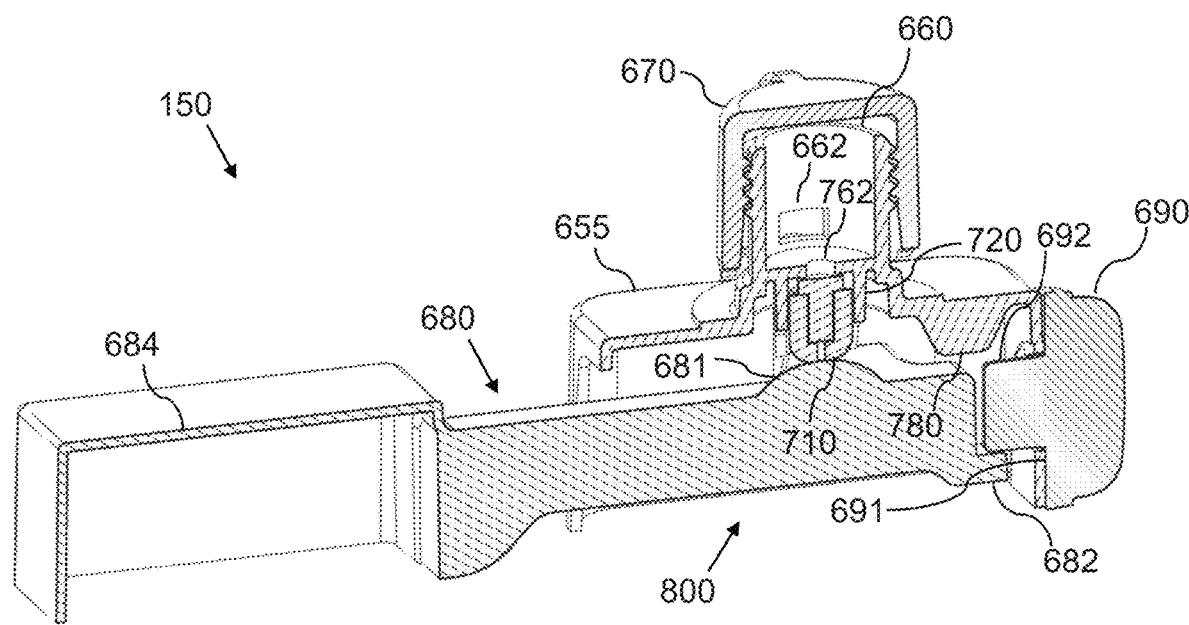
FIG. 8A is a perspective view of a section cut of a float valve assembly in the closed position, according to an embodiment of the invention.
Figure 8B:
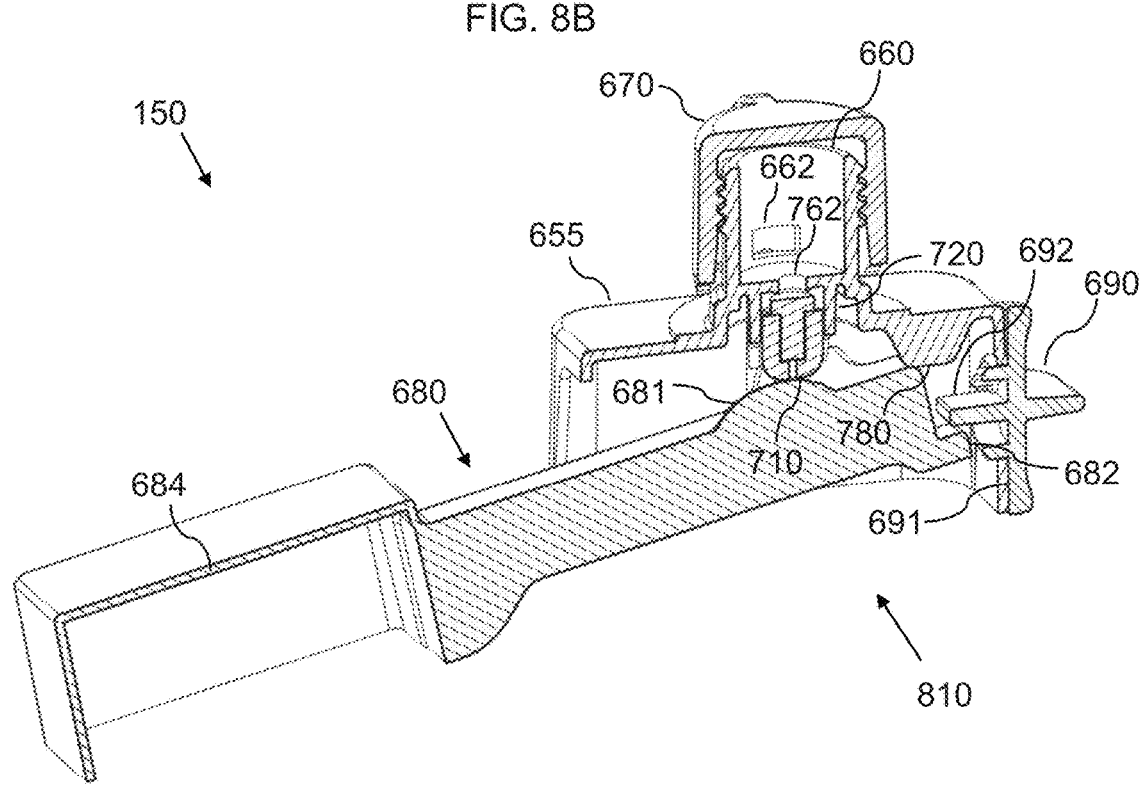
FIG. 8B is a perspective view of a section cut of a float valve assembly in the open position, according to an embodiment of the invention.

In a related embodiment, as shown in FIGS. 6A, 6B, 6C, 7D, 7E, 8A, 8B, 10A and 10B, the float valve assembly 150 can include:

a) a float valve body 655, which can be configured with an open bottom surface, such that the liquid 180 can be released into the drinking trough 160 through the open bottom surface;

b) an inlet 660, which can protrude from an upper surface of the float valve body 655, such that the inlet 660 can be configured to fill with the liquid 180, such that the inlet 660 can be configured to release the liquid 180;

c) a tube 720, which can protrude from underneath the inlet 660, such that the tube 720 can be fluidly connected with the inlet 660, wherein the tube 720 is mounted at least partially inside the float valve body 655, such that the tube 720 is fluidly connected between the liquid container 110 and the drinking trough 160, wherein an upper part of the tube 720 comprises an upper plate 761, which comprises an upper tube aperture 762, which provides a fluid connection to the tube 720; and d) a piston assembly 710, which can be positioned in the tube 720, such that the piston assembly 710 can move longitudinally in the tube 720, such that when an upper surface of the piston assembly 710 is flush against an inner surface of the upper plate of the tube 720, as shown in FIG. 7E, the liquid 180 cannot be released from the inlet 660, such that when the piston assembly 710 moves downwards, the liquid 180 can be released from the inlet 660, such that the flow of the liquid 180 resumes; and e) a float arm 680, which can be rotatably connected to the float valve body 655, such that an inner end 683 of the float arm can be rotatably connected to the float valve body 655, such that an outer end 684 of the float arm can include a floating material, such that the outer end 684 of the float arm 680 can rotate downward when not lifted by the liquid 180; wherein the float arm 680 can contact with (i.e. touch/impact) a bottom end of the piston assembly 710, such that the float arm 680 can longitudinally move the piston assembly 710 vertically when the float arm 680 rotates;

such that the flow of the liquid 180 from the liquid container to the drinking trough is stopped when the float arm 680 is rotated to a maximum horizontal position 800, and such that the flow of the liquid 180 is released when the float arm 680 rotates downwards;

whereby the liquid 180 cannot be released from the inlet 660 when the float arm 680 rotates to a closed maximum horizontal position 800, as shown in FIG. 8A, such that the liquid 180 can be released from the inlet 660 when the float arm 860 rotates downwards, as shown in FIG. 8B.

In a related embodiment, as shown in FIGS. 6A, 7D, 7E, 8A, 8B, 10A and 10B, the inlet 660 can include:

a) filling apertures 662, which can protrude through a wall of the inlet 660, such that the liquid 180 can fill the inlet 660 through the filling apertures 662, such that the liquid 180 can fill the inlet 660; and b) an emptying/tube aperture 762, which can protrude through a bottom surface of the inlet 660 into the tube 720, such that the liquid 180 in the inlet can empty out from the inlet 660 into the tube 720 through the emptying/tube aperture 762.

Figure 6B:
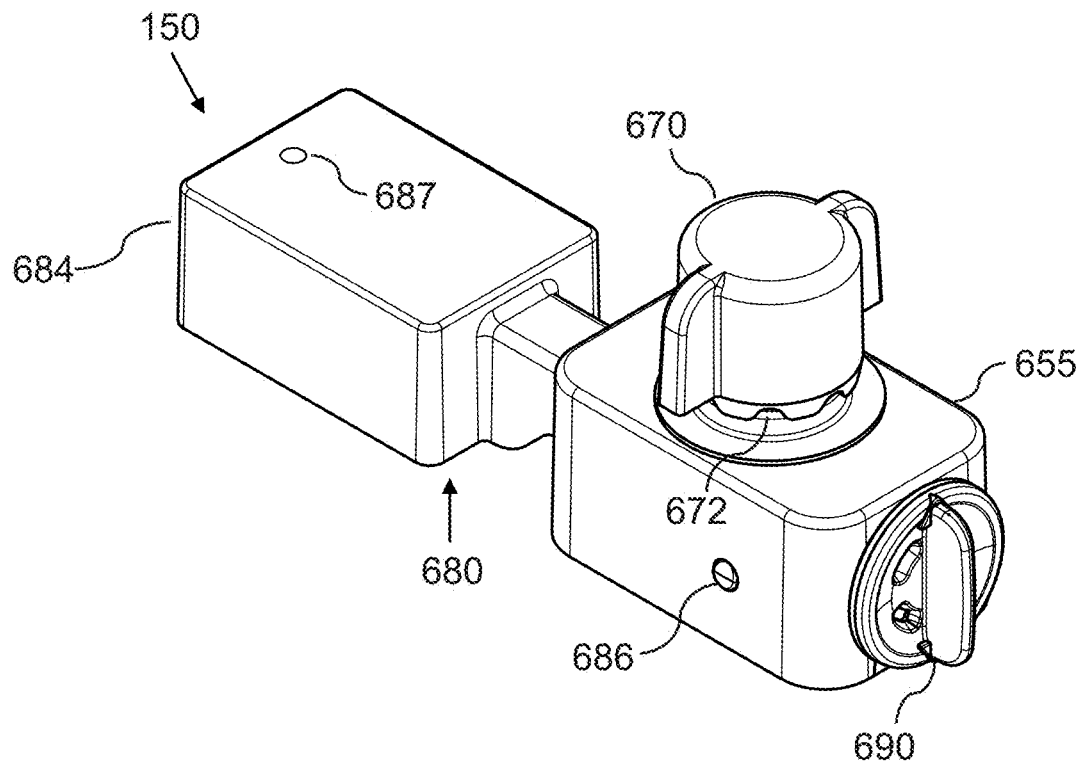
FIG. 6B is a top perspective view of a float valve assembly, according to an embodiment of the invention.
Figure 6C:
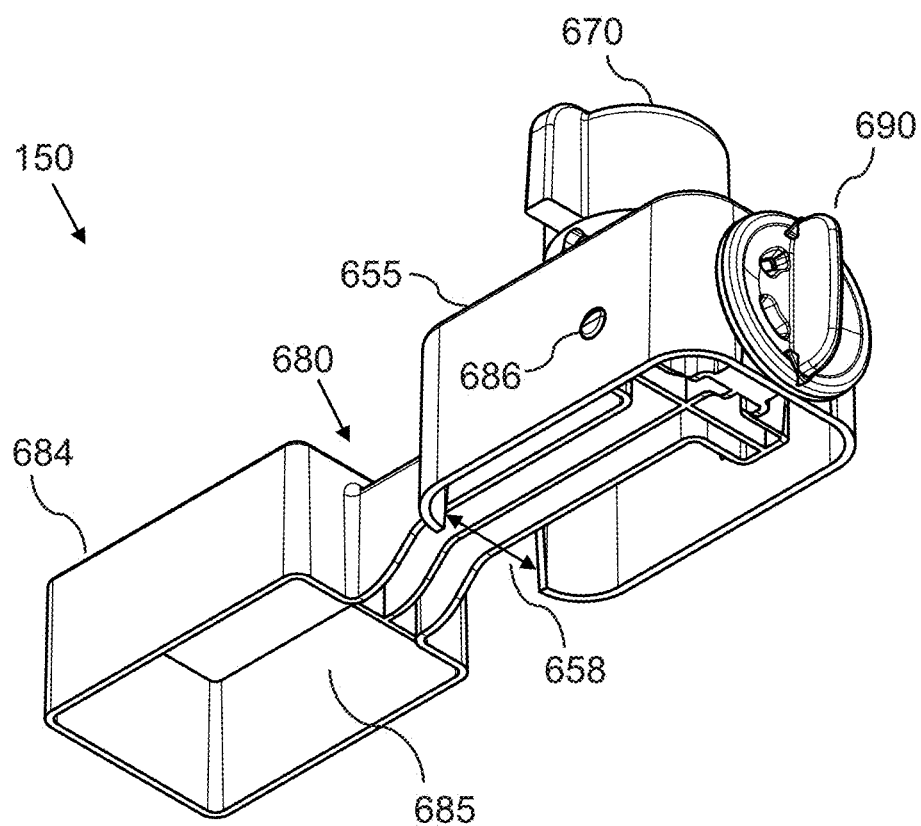
FIG. 6C is a bottom perspective view of a float valve assembly, according to an embodiment of the invention.

In a related embodiment, as shown in FIGS. 6A, 6B, and 6C, the float valve body 655 can include:

a) float arm apertures 656, which can laterally protrude through the upper end of the float valve body 655; and b) a rear opening 658, which can protrude through a rear surface of the float valve body 655;

wherein the float arm 680 can include a float arm axle 686, which can protrude through the inner end 683 of the float arm 680, such that float arm axle 686 can be inserted into the float arm apertures 656, such that the float arm 680 can rotate about the float arm axle 686;

whereby the float arm 680 can rotate within the rear opening 658.

In a related embodiment, as shown in FIGS. 6A, 8A, 8B, 10A, and 10B, the float arm 680 can further include:

a) a rounded protrusion 681, which can protrude from an upper surface of the float arm 680, such that the rounded protrusion 681 can be configured to contact with a bottom surface of the piston assembly 710, such that the rounded protrusion 681 can push the piston assembly 710 to the upper surface of the tube 720 when the float arm 680 is in the closed maximum horizontal position 800, such that when the float arm 680 rotates downwards, the rounded protrusion 681 can rotate to allow the piston assembly 710 to move downward, due to pressure of the liquid/water 180.

In a related embodiment, as shown in FIGS. 7A, 7B, 7C, 7D, 7E, 8A, 8B, 10A and 10B, the piston assembly 710 can include:

a) a piston body 715, which comprises an elongated aperture 714 in an upper surface of the piston body, such that the elongated aperture 714 can protrude into the piston body 715, such that the plug 716 can be inserted into the elongated aperture 714, such that the plug 716 can longitudinally move with the piston assembly 710; and b) a plug 716, which can be configured to be flush against the upper surface of the tube 720 when the float arm 680 is in the closed maximum horizontal position 800, such that a lower portion 718 of the plug 716 can be inserted into the elongated aperture 714, such that the plug 716 can longitudinally move with the piston assembly 710;

wherein the plug 716 can plug the inlet 660 when the float arm 680 is in the closed maximum horizontal position 800, such that the plug 716 can unplug the inlet 660 when the float arm 680 rotates downwards;

such that an upper surface of the plug 716 blocks the upper tube aperture 762 when the float arm 680 is rotated to the maximum horizontal position 800.

In a further related embodiment, the piston body 715 can further include:

a) a pressure release aperture 713, which can be positioned in a lower part of the piston assembly 710, such that the pressure release aperture 713 provides access to the elongated aperture 714;

such that the pressure release aperture 713 facilitates insertion of a lower end of the plug 713 into the elongated aperture 714, by avoiding a potential buildup of air pressure.

In a related embodiment, as shown in FIGS. 7A, 7B, 7C, 7D, 7E, 8A, 8B, 10A and 10B, the piston body 715 can include:

a) a plurality of side channels 712, which can indent along an outer side surface of the piston body 715, such that the liquid 180 from the inlet 660 can flow through the side channels 712 when the piston assembly 710 longitudinally moves down from the upper surface of the tube 720; and In a related embodiment, as shown in FIG. 7C, the plug 716 can further include:

a) an upper portion 717, which can be disc-shaped; and
b) a lower portion 718, which can also be called a stem 718, wherein the lower portion 718 is connected to a bottom of the upper portion 717, wherein the lower portion 718 is narrower than the upper portion 717, such that the upper portion 717 will rest on an upper surface of the piston body 715, when the lower portion 718 is inserted into the elongated aperture 714 of the piston body 715.

In a further related embodiment, as shown in FIG. 7A, the upper portion 717 of the plug 716 can be narrower than a circumference of the piston body 715, such that the upper portion 717 does not block the side channels 712 to allow the flow of liquid when the upper portion 717 is not blocking the upper tube aperture 762.

In another related embodiment, as shown in FIGS. 6A, 6B, 6C, 9A, 9B and 9C, the liquid container 110 can further include:

a) a float valve aperture 960, which can protrude through a bottom surface of the liquid container 110, such that the float valve aperture 960 is configured to receive the inlet 660, such that the inlet 660 can be inserted through the float valve aperture 960; and wherein the poultry drinker system 100 can further include a threaded cap 670;

wherein the inlet 660 can be configured with a threaded outer edge 663, such that the threaded cap 670 can be configured to screw onto the inlet 660;

such that the threaded cap 670 can be screwed onto the inlet 660 when the inlet 660 is inserted through the float valve aperture 960, such that the float valve assembly 150 can attach to the liquid container 110;

wherein the threaded cap 670 can include indentations 672 on a lower rim, such that the liquid 180 from the liquid container 110 can flow through the indentations 672 into the inlet 660, such that the liquid 180 from the liquid container 110 can fill the inlet 660.

In a related embodiment, as shown in FIGS. 7D, 7E, 8A and 8B, the float valve body 655 can include a float arm stopper 780, which can protrude from an interior upper surface of the float valve body 655, such that the float arm stopper 780 can stop the inner end 683 of the float arm 680 from rotating, such that the float arm stopper 780 stops the float arm 680 at a maximum downward position 810, as shown in FIG. 8B.

In a related embodiment, as shown in FIGS. 6A, 6B, 6C, 7C, 7D, 7E, 8A, 8B, 10A and 10B, the float valve assembly 150 can further include:

a) a float valve control dial 690, which can be attached to a front surface of the float valve body 655 through a float valve control dial aperture 657, such that the float valve control dial 690 can be rotated when the float valve assembly 150 is attached to the liquid container 110;

wherein the float valve control dial 690 (or the float valve assembly 150) can include a rectangular plate 692, which can protrude from an interior surface 691 of the float valve control dial 690, such that the rectangular plate 692 protrudes into the float valve body 655, such that when the float valve control dial 690 is rotated, the rectangular plate 692 can rotate inside the float valve body 655;

wherein the float arm 680 can be configured with a flange 682, which protrudes from a bottom end of a front surface 688 of the float arm 680, such that when the rectangular plate 692 is rotated in a vertical position, as shown in FIG. 8A, the flange 682 locks the float arm 680 can be locked in the closed maximum horizontal position 800, such that the liquid 180 cannot be released from the inlet 660, such that the flow of the liquid 180 is stopped;

such that when the rectangular plate 692 is rotated to be in a horizontal position, as shown in FIG. 8A, the float arm 680 can rotate downwards to release the liquid 180 from the inlet 660;

whereby the float valve control dial 690 can be rotated to allow the float arm to rotate downward and release the liquid 180, such that the float valve control dial 690 can be rotated to move the float arm 680 from the maximum downward position 810 to the closed maximum horizontal position 800 to stop releasing the liquid 180.

Figure 10A:
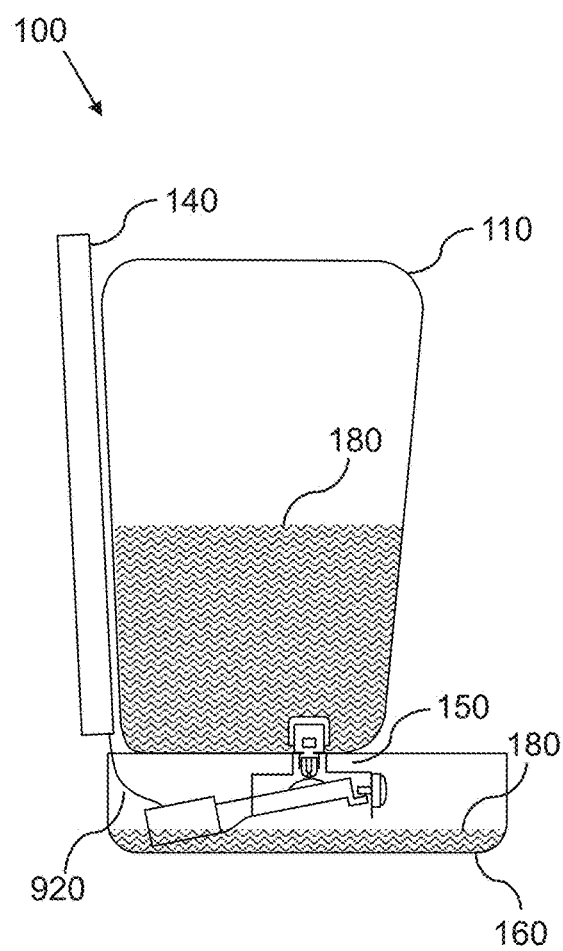
FIG. 10A is a schematic diagram illustrating an open float valve assembly in the open position, according to an embodiment of the invention.
Figure 10B:
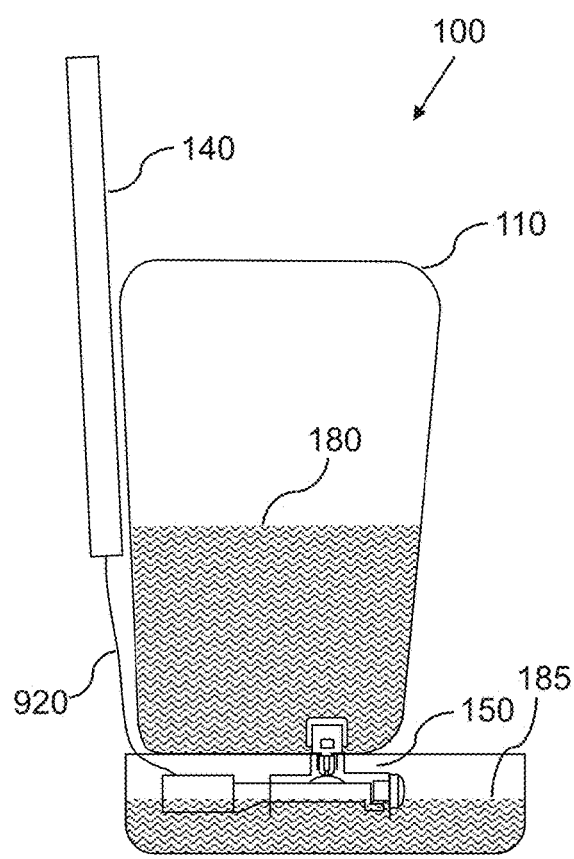
FIG. 10B is a schematic diagram of a float valve assembly in the closed position, according to an embodiment of the invention

In a related embodiment, as shown in FIGS. 6C, 8A, 8B, 10A and 10B, the float arm 680 can further include:

a) an outer cavity 685, which can be filled with the floating material, such that the outer cavity 685 can float when the drinking trough 160 is filled with the liquid 180, such that the float arm 680 can float until it rotates to the closed maximum horizontal position 800;

whereby as the liquid 180 in the drinking trough 160 decreases, the float arm 680 can rotate downwards, such that the float arm 680 can allow the float valve assembly 150 to release the liquid 180 until the liquid 180 once again rises to the predetermine maximum liquid level 185, as shown in FIG. 10B, that can rotate the float arm 680 to the closed maximum horizontal position 800.

In another related embodiment, as shown in FIGS. 6A, 6B, 9D, 10A and 10B, the float arm 680 can include a string aperture 687, which can be protruded through an upper surface of the outer end 684;

wherein the poultry drinker system 100 can further include:
a) a string 920, which can be inserted through the string aperture 687 and attached to the outer end 684 of the float arm 680, wherein the string can connect to the lower end of the handle body 541, such that when the handle 140 is extended, as shown in FIG. 9D, the string 920 can pull up the float arm 680 to the closed maximum horizontal position 800, such that the float valve assembly 150 cannot release the liquid 180 when the handle 140 is extended, such that the float valve assembly 150 can release the liquid 180 when the handle 140 is not extended;

whereby the float valve assembly 150 closes and cannot release the liquid 180 when the handle 140 is extended to roll the poultry drinker system.

In yet a related embodiment, the poultry drinker system 100 can further include:

a) at least one heater, which is configured to heat the water, wherein the at least one heater can include a main heater positioned in the liquid container 110 and a trough heater positioned in the drinking trough 160, wherein the at least one heater can be powered from a single source of power and be controlled by at least one thermostat.

Here has thus been described a multitude of embodiments of the poultry drinker system, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A poultry drinker system, comprising:
   a) a liquid container, which includes a top opening, such that a liquid is poured into the liquid container through the top opening;
   b) a drinking trough, which attaches to a bottom end of the liquid container, such that the liquid container is fluidly connected to the drinking trough;
      such that poultry drink the liquid from the drinking trough;
   c) a float valve assembly, which is attached to the bottom end of the liquid container, such that the float valve assembly is configured to regulate a flow of the liquid from the liquid container into the drinking trough, wherein the float valve assembly comprises:
      a float valve body;
      a tube, which is mounted at least partially inside the float valve body, such that the tube is fluidly connected between the liquid container and the drinking trough, wherein an upper part of the tube comprises an upper plate, which comprises an upper tube aperture, which provides a fluid connection to the tube;
      a piston assembly, which is positioned in the tube, such that the piston assembly is longitudinally moveable in the tube, such that when an upper surface of the piston assembly is flush against an inner surface of the upper plate of the tube, the piston assembly blocks the upper tube aperture, such that a flow of the liquid from the liquid container to the drinking trough is stopped;
      such that when the piston assembly is moved downward, away from the upper plate of the tube, the flow of the liquid resumes; and
      a float arm, wherein an inner end of the float arm is rotatably connected to the float valve body, such that an outer end of the float arm comprises a floating material, such that the floating material floats on a surface of the liquid in the drinking trough;
      wherein the float arm contacts a bottom end of the piston assembly, such that the float arm moves the piston assembly vertically when the float arm rotates;
      such that the flow of the liquid from the liquid container to the drinking trough is stopped when the float arm is rotated to a maximum horizontal position, and such that the flow of the liquid is released when the float arm rotates downwards;
   d) a handle, which is extendably attached to a rear side of the liquid container, such that the handle is upwards slidable to an extended height that enables a user to roll the poultry drinker system; and
   e) a string, such that a first end of the string is connected to a lower end of the handle body and a second end of the string is connected to the outer end of the float arm, such that when the handle is extended, the string pulls the float arm up to the maximum horizontal position, such that the float valve assembly blocks a flow of the liquid when the handle is extended;
      whereby the float valve assembly blocks the flow of the liquid when the handle is extended to roll the poultry drinker system;
   wherein the float valve assembly is configured to close when the liquid in the drinking trough has reached a predetermined maximum liquid level, and wherein the float valve assembly is configured to open when the liquid in the drinking trough is below the predetermined maximum liquid level;
      whereby the float valve assembly maintains the predetermined maximum liquid level in the drinking trough as the poultry drink the liquid in the drinking trough.

2. The poultry drinker system of claim 1, further comprising:
   at least one wheel, which is attachable to a bottom rear end of the liquid container, such that the poultry drinker system is rollable for easy portability.

3. The poultry drinker system of claim 1, further comprising:
   a sieve, which is configured to be insertable into the drinking trough, such that the sieve is configured to cover a drinking area of the trough, such that the sieve is removable from the drinking trough;
   wherein the sieve includes a plurality of apertures, such that when the sieve is removed from the drinking trough, the liquid filters through the plurality of apertures, such that remaining debris in the sieve is removed from the drinking trough.

4. The poultry drinker system of claim 1, wherein the float arm comprises:
   a rounded protrusion, which protrudes from an upper surface of the float arm, such that the rounded protrusion is configured to contact the bottom end of the piston assembly, such that the rounded protrusion pushes the piston assembly upward when the outer end of the float arm moves upward.

5. The poultry drinker system of claim 1, wherein the float valve body comprises:
   a float arm stopper, which protrudes from an interior upper surface of the float valve body, such that the float arm stopper is configured to stop the inner end of the float arm from rotating, such that the float arm stopper stops the float arm at a maximum downward position.

6. The poultry drinker system of claim 1, wherein the float valve assembly further comprises:
   a float valve control dial, which is attached to a front surface of the float valve body, such that the float valve control dial is rotatable when the float valve assembly is attached to the liquid container;
      wherein the float valve control dial further comprises a rectangular plate, which protrudes from an interior surface of the float valve control dial, such that the rectangular plate protrudes into the float valve body, such that when the float valve control dial is rotated, the rectangular plate rotates inside the float valve body;
   wherein the float arm is configured with a flange, which protrudes from a bottom end of a front surface of the float arm, such that when the plate is rotated in a vertical position, the flange locks the float arm in the maximum horizontal position, such that the flow of the liquid is stopped;
   such that when the plate is rotated to be in a horizontal position, the float arm rotates downwards to release the liquid;
   whereby the float valve control dial rotates to allow the float arm to rotate downward and release the liquid, such that the float valve control dial is rotated to move the float arm from the maximum downward position to the maximum horizontal position to stop the release of the liquid.

7. The poultry drinker system of claim 1, wherein the float arm further comprises:

an outer cavity, positioned in the outer end of the float arm, wherein the outer cavity is filled with the floating material.

8. The poultry drinker system of claim 1, further comprising:
a lid assembly, which is configured to detachably attach to an upper rim of the drinking container, such that the lid assembly covers the top opening of the liquid container, such that the lid assembly prevents the liquid from spilling out of the liquid container from the top opening.

9. The poultry drinker of claim 8, wherein the lid assembly further comprises:
a) a lid body, which comprises a lid aperture, wherein the lid aperture protrudes through the lid body, such that the liquid container is fillable with the liquid through the lid aperture, such that the liquid container is fillable with the liquid without removing the lid assembly; and
b) a cap, which is configured to detachably cover the lid aperture, wherein the cap is hingedly connected to the lid body;
such that the cap prevents liquid from spilling out of the liquid container, when the cap is positioned on the lid aperture.

10. The poultry drinker system of claim 1, wherein the handle comprises:
a handle body;
wherein the liquid container further comprises a handle receiving structure, which protrudes from a top rear end of the liquid container, such that the handle receiving structure defines a handle receiving interior that protrudes vertically through the handle receiving structure, such that the handle receiving interior is configured to receive the handle body;
whereby the handle body is slidably insertable through the handle receiving interior, such that the handle is slidable along the rear side of the liquid container.

11. The poultry drinker system of claim 10, wherein the handle further comprises:
a right handle indentation and a left handle indentation, which are elongated vertical indentations of the handle body, such that the right handle indentation is positioned on a right outer side of the handle body and the left handle indentation is positioned on a left outer side of the handle body;
wherein the poultry drinker system further comprises a guide rail, which is positioned in the handle receiving interior, such that the guide rail comprises:
a base plate;
a right guide protrusion, which protrudes from the base plate, such that the right guide protrusion aligns with the right handle indentation, such that the right guide protrusion is insertable into the right handle indentation; and
a left guide protrusion, which protrudes from the base plate, such that the left guide protrusion aligns with the left handle indentation, such that the left guide protrusion is insertable into the left handle indentation;
whereby the handle body slides along the guide rail when the handle body slides through the handle receiving interior, such that the guide rail enables the handle to slide smoothly along the rear side of the liquid container, such that the handle does not twist or move laterally.

12. The poultry drinker system of claim 1, wherein the piston assembly comprises:

a) a piston body, which comprises an elongated aperture in an upper surface of the piston body; and
b) a plug, wherein the plug is configured such that a lower portion of the plug is insertable into the elongated aperture of the piston body;
wherein the lower portion of the plug is inserted into the elongated aperture;
such that an upper surface of the plug blocks the upper tube aperture when the float arm is rotated to the maximum horizontal position.

13. The poultry drinker system of claim 12, wherein the piston body further comprises:
a plurality of side channels, which are elongated vertical indentations along an outer side surface of the piston body, such that the liquid flows through the side channels when the piston assembly is not blocking the upper tube aperture.

14. The poultry drinker system of claim 12, wherein the plug further comprises:
a) an upper portion; and
b) a lower portion, wherein the lower portion is connected to a bottom of the upper portion, wherein the lower portion is narrower than the upper portion;
wherein a circumference of the upper portion is narrower than a circumference of the piston body, such that the upper portion does not block the side channels, to allow the flow of liquid when the upper portion is not blocking the upper tube aperture.

15. The poultry drinker system of claim 1, further comprising:
a) a right wheel, which is rotatably connected to a bottom of the liquid container; and
b) a left wheel, which is rotatably connected to the bottom of the liquid container;
wherein a rear bottom part of the liquid container further comprises:
a left wheel indentation; and
a right wheel indentation;
such that the right wheel is partially embedded inside the right wheel indentation; and
such that the left wheel is partially embedded inside the left wheel indentation;
such that a portion of each of the right wheel and the left wheel protrudes behind the liquid container.

16. The poultry drinker system of claim 15, wherein a rear of the drinking trough further comprises:
a) a left rear opening;
b) a right rear opening;
such that the left rear opening is aligned with the left wheel indentation;
such that the right rear opening is aligned with the right wheel indentation;
such that the left wheel is partially embedded in the left rear opening; and
such that the right wheel is partially embedded in the right rear opening;
such that the right wheel and the left wheel protrude behind the drinking trough;
such that rear protruding portions of the right wheel and the left wheel enable the poultry drinker to be inclined to gain clearance from a floor surface and to be rolled on the right wheel and the left wheel.

17. A poultry drinker system, comprising:
a) a liquid container, which is configured to contain a liquid;

b) a drinking trough, which is attached to the liquid container, such that the liquid container is fluidly connected to the drinking trough; and
c) a float valve assembly, which is attached to the liquid container, such that the float valve assembly is configured to regulate a flow of the liquid from the liquid container into the drinking trough, wherein the float valve assembly comprises:
  a float valve body;
  a tube, which is mounted at least partially inside the float valve body, such that the tube is fluidly connected between the liquid container and the drinking trough, wherein an upper part of the tube comprises an upper plate, which comprises an upper tube aperture, which provides a fluid connection to the tube;
  a piston assembly, which is positioned in the tube, such that the piston assembly is longitudinally moveable in the tube, such that when an upper surface of the piston assembly is flush against an inner surface of the upper plate of the tube, the piston assembly blocks the upper tube aperture, such that a flow of the liquid from the liquid container to the drinking trough is stopped;
    such that when the piston assembly is moved downward, away from the upper plate of the tube, the flow of the liquid resumes; and
  a float arm, wherein an inner end of the float arm is rotatably connected to the float valve body, such that an outer end of the float arm comprises a floating material, such that the floating material floats on a surface of the liquid in the drinking trough;
    wherein the float arm contacts a bottom end of the piston assembly, such that the float arm moves the piston assembly vertically when the float arm rotates;
    such that the flow of the liquid from the liquid container to the drinking trough is stopped when the float arm is rotated to a maximum horizontal position, and such that the flow of the liquid is released when the float arm rotates downwards;
  wherein the piston assembly comprises:
    a piston body, which comprises an elongated aperture in an upper surface of the piston body; and
    a plug, wherein the plug is configured such that a lower portion of the plug is insertable into the elongated aperture of the piston body;
    wherein the lower portion of the plug is inserted into the elongated aperture;
    such that an upper surface of the plug blocks the upper tube aperture when the float arm is rotated to the maximum horizontal position;
  wherein the float valve assembly is configured to close when the liquid in the drinking trough has reached a predetermined maximum liquid level, and wherein the float valve assembly is configured to open when the liquid in the drinking trough is below the predetermined maximum liquid level;
  whereby the float valve assembly maintains the predetermined maximum liquid level in the drinking trough as poultry drink the liquid in the drinking trough.

18. The poultry drinker system of claim 17, wherein the piston body further comprises:
  a plurality of side channels, which are elongated vertical indentations along an outer side surface of the piston body, such that the liquid flows through the side channels when the piston assembly is not blocking the upper tube aperture.

19. A poultry drinker system, comprising:
a) a liquid container, which is configured to contain a liquid;
b) a drinking trough, which is attached to the liquid container, such that the liquid container is fluidly connected to the drinking trough; and
c) a float valve assembly, which is attached to the liquid container, such that the float valve assembly is configured to regulate a flow of the liquid from the liquid container into the drinking trough;
d) at least one wheel, which is attachable to a bottom rear end of the liquid container, such that the poultry drinker system is rollable for easy portability; and
e) a handle, which is extendably attached to a rear side of the liquid container, such that the handle is upwards slidable to an extended height that enables a user to roll the poultry drinker system, wherein the handle comprises:
  a handle body;
  a right handle indentation and a left handle indentation, which are elongated vertical indentations of the handle body, such that the right handle indentation is positioned on a right outer side of the handle body and the left handle indentation is positioned on a left outer side of the handle body;
  wherein the liquid container further comprises a handle receiving structure, which protrudes from a top rear end of the liquid container, such that the handle receiving structure defines a handle receiving interior that protrudes vertically through the handle receiving structure, such that the handle receiving interior is configured to receive the handle body;
  whereby the handle body is slidably insertable through the handle receiving interior, such that the handle is slidable along the rear side of the liquid container;
wherein the float valve assembly is configured to close when the liquid in the drinking trough has reached a predetermined maximum liquid level, and wherein the float valve assembly is configured to open when the liquid in the drinking trough is below the predetermined maximum liquid level;
whereby the float valve assembly maintains the predetermined maximum liquid level in the drinking trough as poultry drink the liquid in the drinking trough; and
wherein the poultry drinker system further comprises a guide rail, which is positioned in the handle receiving interior, such that the guide rail comprises:
  a base plate;
  a right guide protrusion, which protrudes from the base plate, such that the right guide protrusion aligns with the right handle indentation, such that the right guide protrusion is insertable into the right handle indentation; and
  a left guide protrusion, which protrudes from the base plate, such that the left guide protrusion aligns with the left handle indentation, such that the left guide protrusion is insertable into the left handle indentation;
whereby the handle body slides along the guide rail when the handle body slides through the handle receiving interior, such that the guide rail enables the handle to slide smoothly along the rear side of the liquid container, such that the handle does not twist or move laterally.

20. A poultry drinker system, comprising:
a) a liquid container, which is configured to contain a liquid;
b) a drinking trough, which is attached to the liquid container, such that the liquid container is fluidly connected to the drinking trough; and
c) a float valve assembly, which is attached to the liquid container, such that the float valve assembly is configured to regulate a flow of the liquid from the liquid container into the drinking trough, wherein the float valve assembly comprises:
a float valve body;
a tube, which is mounted at least partially inside the float valve body, such that the tube is fluidly connected between the liquid container and the drinking trough, wherein an upper part of the tube comprises an upper plate, which comprises an upper tube aperture, which provides a fluid connection to the tube;
a piston assembly, which is positioned in the tube, such that the piston assembly is longitudinally moveable in the tube, such that when an upper surface of the piston assembly is flush against an inner surface of the upper plate of the tube, the piston assembly blocks the upper tube aperture, such that a flow of the liquid from the liquid container to the drinking trough is stopped;
such that when the piston assembly is moved downward, away from the upper plate of the tube, the flow of the liquid resumes; and
a float arm, wherein an inner end of the float arm is rotatably connected to the float valve body, such that an outer end of the float arm comprises a floating material, such that the floating material floats on a surface of the liquid in the drinking trough;
wherein the float arm contacts a bottom end of the piston assembly, such that the float arm moves the piston assembly vertically when the float arm rotates;
such that the flow of the liquid from the liquid container to the drinking trough is stopped when the float arm is rotated to a maximum horizontal position, and such that the flow of the liquid is released when the float arm rotates downwards;
wherein the float valve body comprises:
a float arm stopper, which protrudes from an interior upper surface of the float valve body, such that the float arm stopper is configured to stop the inner end of the float arm from rotating, such that the float arm stopper stops the float arm at a maximum downward position;
wherein the float valve assembly is configured to close when the liquid in the drinking trough has reached a predetermined maximum liquid level, and wherein the float valve assembly is configured to open when the liquid in the drinking trough is below the predetermined maximum liquid level;
whereby the float valve assembly maintains the predetermined maximum liquid level in the drinking trough as poultry drink the liquid in the drinking trough.

21. A poultry drinker system, comprising:
a) a liquid container, which is configured to contain a liquid;
b) a drinking trough, which is attached to the liquid container, such that the liquid container is fluidly connected to the drinking trough; and
c) a float valve assembly, which is attached to the liquid container, such that the float valve assembly is configured to regulate a flow of the liquid from the liquid container into the drinking trough, wherein the float valve assembly comprises:
a float valve body;
a tube, which is mounted at least partially inside the float valve body, such that the tube is fluidly connected between the liquid container and the drinking trough, wherein an upper part of the tube comprises an upper plate, which comprises an upper tube aperture, which provides a fluid connection to the tube;
a piston assembly, which is positioned in the tube, such that the piston assembly is longitudinally moveable in the tube, such that when an upper surface of the piston assembly is flush against an inner surface of the upper plate of the tube, the piston assembly blocks the upper tube aperture, such that a flow of the liquid from the liquid container to the drinking trough is stopped;
such that when the piston assembly is moved downward, away from the upper plate of the tube, the flow of the liquid resumes; and
a float arm, wherein an inner end of the float arm is rotatably connected to the float valve body, such that an outer end of the float arm comprises a floating material, such that the floating material floats on a surface of the liquid in the drinking trough;
wherein the float arm contacts with a bottom end of the piston assembly, such that the float arm moves the piston assembly vertically when the float arm rotates;
such that the flow of the liquid from the liquid container to the drinking trough is stopped when the float arm is rotated to a maximum horizontal position, and such that the flow of the liquid is released when the float arm rotates downwards;
a float valve control dial, which is attached to a front surface of the float valve body, such that the float valve control dial is rotatable when the float valve assembly is attached to the liquid container;
wherein the float valve control dial further comprises a rectangular plate, which protrudes from an interior surface of the float valve control dial, such that the rectangular plate protrudes into the float valve body, such that when the float valve control dial is rotated, the rectangular plate rotates inside the float valve body;
wherein the float arm is configured with a flange, which protrudes from a bottom end of a front surface of the float arm, such that when the plate is rotated in a vertical position, the flange locks the float arm in the maximum horizontal position, such that the flow of the liquid is stopped;
such that when the plate is rotated to be in a horizontal position, the float arm rotates downwards to release the liquid;
whereby the float valve control dial rotates to allow the float arm to rotate downward and release the liquid, such that the float valve control dial is rotated to move the float arm from the maximum downward position to the maximum horizontal position to stop the release of the liquid;
wherein the float valve assembly is configured to close when the liquid in the drinking trough has reached a predetermined maximum liquid level, and wherein the float valve assembly is configured to open when the liquid in the drinking trough is below the predetermined maximum liquid level;

whereby the float valve assembly maintains the predetermined maximum liquid level in the drinking trough as poultry drink the liquid in the drinking trough.

22. A poultry drinker system, comprising:
a) a liquid container, which is configured to contain a liquid;
b) a drinking trough, which is attached to the liquid container, such that the liquid container is fluidly connected to the drinking trough; and
c) a float valve assembly, which is attached to the liquid container, such that the float valve assembly is configured to regulate a flow of the liquid from the liquid container into the drinking trough, wherein the float valve assembly comprises:
   a float valve body;
   a tube, which is mounted at least partially inside the float valve body, such that the tube is fluidly connected between the liquid container and the drinking trough, wherein an upper part of the tube comprises an upper plate, which comprises an upper tube aperture, which provides a fluid connection to the tube;
   a piston assembly, which is positioned in the tube, such that the piston assembly is longitudinally moveable in the tube, such that when an upper surface of the piston assembly is flush against an inner surface of the upper plate of the tube, the piston assembly blocks the upper tube aperture, such that a flow of the liquid from the liquid container to the drinking trough is stopped; such that when the piston assembly is moved downward, away from the upper plate of the tube, the flow of the liquid resumes; and
   a float arm, wherein an inner end of the float arm is rotatably connected to the float valve body, such that an outer end of the float arm comprises a floating material, such that the floating material floats on a surface of the liquid in the drinking trough, wherein the float arm further comprises:
      an outer cavity, positioned in the outer end of the float arm, wherein the outer cavity is filled with the floating material;
   wherein the float arm contacts a bottom end of the piston assembly, such that the float arm moves the piston assembly vertically when the float arm rotates;
   such that the flow of the liquid from the liquid container to the drinking trough is stopped when the float arm is rotated to a maximum horizontal position, and such that the flow of the liquid is released when the float arm rotates downwards;
wherein the float valve assembly is configured to close when the liquid in the drinking trough has reached a predetermined maximum liquid level, and wherein the float valve assembly is configured to open when the liquid in the drinking trough is below the predetermined maximum liquid level;
whereby the float valve assembly maintains the predetermined maximum liquid level in the drinking trough as poultry drink the liquid in the drinking trough.

* * * * *